(12) United States Patent
Zheng

(10) Patent No.: US 8,126,470 B2
(45) Date of Patent: Feb. 28, 2012

(54) TOPOLOGY AND ROUTE DISCOVERY AND MANAGEMENT FOR RELAY NETWORKS

(75) Inventor: Haihong Zheng, Coppell, TX (US)

(73) Assignee: Nokia Corporation, Espoo (FI)

( * ) Notice: Subject to any disclaimer, the term of this patent is extended or adjusted under 35 U.S.C. 154(b) by 1234 days.

(21) Appl. No.: 11/480,767

(22) Filed: Jul. 3, 2006

(65) Prior Publication Data
US 2008/0291847 A1 Nov. 27, 2008

(51) Int. Cl.
*H04Q 7/20* (2006.01)
(52) U.S. Cl. ....... 455/446; 455/11.1; 370/328; 370/315; 370/390; 370/432
(58) Field of Classification Search ........... 370/315, 370/390, 432; 455/11.1
See application file for complete search history.

(56) References Cited

U.S. PATENT DOCUMENTS
7,646,752 B1  1/2010 Periyalwar et al.
(Continued)

FOREIGN PATENT DOCUMENTS
EP  1524800 A2  4/2005
(Continued)

OTHER PUBLICATIONS
Saifullah, Y. et al., "Clarification on CDMA Codes TLV", IEEE 802.16 Broadband Wireless Access Working Group, (Jul. 13, 2007),16j-07/402r3, pp. 3.
(Continued)

*Primary Examiner* — Charles Shedrick
(74) *Attorney, Agent, or Firm* — Brake Hughes Bellermann LLP

(57) ABSTRACT

Various example embodiments are disclosed relating to route discovery and management in relay networks. In an example embodiment, a first message may be received at a first network station in a wireless network. It may be determined whether the received first message includes an identifier of a second network station indicating an attachment of a network node to the second network station. The received first message may be modified to include an identifier of the first network station indicating an attachment of the network node to the first network station if it is determined that the received message does not include the identifier of the second network station. The received first message may be forwarded to a third network station. Various techniques may also be provided for updating and managing a network topology, e.g., for discovering, updating, and selecting communication paths for network traffic.

23 Claims, 14 Drawing Sheets

U.S. PATENT DOCUMENTS

| | | | |
|---|---|---|---|
| 7,889,713 | B2 | 2/2011 | Zheng et al. |
| 2002/0080736 | A1 | 6/2002 | Furukawa |
| 2002/0191573 | A1 | 12/2002 | Whitehill et al. |
| 2003/0091014 | A1 | 5/2003 | Meier |
| 2004/0025018 | A1 | 2/2004 | Haas et al. |
| 2004/0109493 | A1 | 6/2004 | Blessent et al. |
| 2004/0170147 | A1 | 9/2004 | Take |
| 2005/0058151 | A1 | 3/2005 | Yeh |
| 2005/0117539 | A1 | 6/2005 | Song et al. |
| 2005/0232183 | A1 | 10/2005 | Sartori et al. |
| 2005/0286547 | A1 | 12/2005 | Baum et al. |
| 2006/0107166 | A1 | 5/2006 | Nanda |
| 2006/0176973 | A1 | 8/2006 | Alamouti et al. |
| 2007/0097915 | A1 | 5/2007 | Papasakellarlou |
| 2007/0097945 | A1 * | 5/2007 | Wang et al. .......... 370/349 |
| 2007/0110016 | A1 | 5/2007 | Shen et al. |
| 2008/0002610 | A1 | 1/2008 | Zheng et al. |
| 2008/0039014 | A1 | 2/2008 | Tsai et al. |
| 2008/0056193 | A1 | 3/2008 | Bourlas et al. |
| 2008/0117854 | A1 | 5/2008 | Saifullah et al. |

FOREIGN PATENT DOCUMENTS

| | | | |
|---|---|---|---|
| EP | 1912390 | A1 | 10/2006 |
| JP | 04-341031 | | 11/1992 |
| JP | 11-177622 | | 7/1999 |
| JP | 2001-237875 | | 8/2001 |
| WO | 0055640 | A2 | 9/2000 |
| WO | 2006023771 | A2 | 3/2006 |
| WO | 2006096728 | A2 | 9/2006 |
| WO | 2008/004062 | A8 | 1/2008 |
| WO | 2008004062 | A2 | 1/2008 |
| WO | 2008004062 | A3 | 1/2008 |
| WO | 2008004066 | A2 | 1/2008 |
| WO | 2008004066 | A3 | 1/2008 |
| WO | 2008047203 | A2 | 4/2008 |
| WO | 2008047203 | A3 | 4/2008 |

OTHER PUBLICATIONS

Saifullah, Y. et al., "Resource Request for Bandwidth", IEEE 802.16 Broadband Wireless Access Working Group, (Jan. 18, 2007),16j-07/039r3, pp. 9.
Saifullah, Y. et al., "Resource Request for Bandwidth", IEEE 802.16 Presentation Submission Template (Rev 8.3), (Nov. 15, 2006),16j-06/189 ,pp. 5.
Pabst, R. "Realy—Based Deployment Concepts for Wireless and Mobile Broadband Radio", IEEE Communications Magazine, (Sep. 2004),pp. 80-88.
Johnson, D. B., "Dynamic Source Routing in Ad Hoc Wireless Networks", Carnegie Mellon University, (1995), pp. 1-18.
"Air Interface for Fixed Broadband Wireless Access Systems", IEEE Standard 802.16-2004, (Oct. 1, 2004), pp. 42-44.
Wiemann, H et al., "A Novel Multi-Hop ARQ Concept", Vehicular Technology Conference, VTC 2005-Spring. 2005 IEEE 6th, 3097-3101 (Jun. 2005).
Marks, R et al., "IEEE Standard 802.16: A Technical Overview of the WirelessMAN Air Interface for Broadband Wireless Access", Retrieved from: www.ieee802.org/16/docs/02/C80216-02_05.pdf,(Jun. 4, 2002),98/107.
Zheng, H et al., "Transmission Scheme of MAC Management Message towards a RS Group in multi-hop relay System", IEEE 0802.16j-07_033, Retrieved from: www.ieee802.org/16/relay/index.html,(Jan. 8, 2007),section 1-2,4.
Zheng, H et al., "HARQ with Relays", IEEE C802.16j-06/197r1, Retrieved from: www.ieee802.org/16/relay/index.html, whole document,(Nov. 7, 2006).
English Translation of Office Action for Israeli Application Serial No. 195928, mailed Feb. 24, 2010, 2 pages.
Office Action for Russian Patent Application No. 2009117689 (with English Translation), mailed on Aug. 13, 2010,12 pages.
Final Office Action for U.S. Appl. No. 11/549,387, mailed on Aug. 5, 2010, 7 pages.
Non-Final Office Action for U.S. Appl. No. 11/871,649, mailed on Oct. 19, 2010, 24 pages.
Notice of Allowance for U.S. Appl. No. 11/549,387, mailed Oct. 19, 2010, 14 pages.
Office Action for Korean Application No. 2008-7031882 (with English Translation), mailed on Dec. 24, 2010, 4 pages.
Office Action for Indonesian Application No. W00200804127 (with English Translation), mailed Feb. 17, 2011, 6 pages.
Non-Final Office Action Response for U.S. Appl. No. 11/871,649, filed Mar. 30, 2011, 22 pages.
Office Action for Chinese Application No. 200780024974.1 (with English Translation), mailed Apr. 20, 2011, 9 pages.
Office Action for Indonesian Application No. W00200804069 (with English Translation), mailed Apr. 27, 2011, 4 pages.
Wiemann, et al, "A Novel Multi-Hop ARQ Concept", Vehicular Technology Conference, vol. 5, Jun. 1, 2005, 5 pages.
Office Action for Chinese Application No. 200780024815.1 (with English Translation), mailed Apr. 26, 2011, 19 pages.
Notice of Allowance for Korean Patent Application Serial No. 2008-7031888, mailed on Aug. 10, 2011, 3 pages.
Final Office Action for U.S. Appl. No. 11/871,649, mailed Jun. 7, 2011, 17 pages.
Shen, et al, "Recommendations on IEEE 802.16j", IEEE 802.16j-06/004r1, Rev. 8.3, May 8, 2006, 15 pages.
Office Action for JP Application No. 2009-517471 (with English Translation), mailed Jun. 13, 2011, 9 pages.
Office Action for JP Application No. 2009-517470 (with English Translation), mailed Jun. 13, 2011, 16 pages.
Office Action for KR Application No. 2008-7031888 (with English Translation), mailed Apr. 20, 2011, 4 pages.
"6.3.2.3.5 Ranging Request (RNG-REQ) message", Air Interface for Fixed Broadband Wireless Access Systems, IEEE Std 802.16-2004 (Oct. 1, 2004), p. 49.

* cited by examiner

TOPOLOGY AND ROUTE DISCOVERY AND MANAGEMENT FOR RELAY NETWORKS

BACKGROUND

The rapid diffusion of Wireless Local Area Network (WLAN) access and the increasing demand for WLAN coverage is driving the installation of a very large number of Access Points (AP). The most common WLAN technology is described in the Institute of Electrical and Electronics Engineers IEEE 802.11 family of industry specifications, such as specifications for IEEE 802.11b, IEEE 802.11g and IEEE 802.11a. Other wireless technologies are being developed, such as IEEE 802.16 or WiMAX technology. A number of different 802.11 task groups are involved in developing specifications relating to improvements to the existing 802.11 technology. For example, a draft specification from the IEEE 802.11e Task Group has proposed a set of QoS parameters to be used for traffic between an Access Point and a station. See, e.g., Tim Godfrey, "Inside 802.11e: Making QoS A Reality Over WLAN Connections," CommsDesign, Dec. 19, 2003. Similarly in Ultra Wideband (UWB) environment, the WiMedia Alliance has published a draft standard, "Distributed Medium Access Control (MAC) for Wireless Networks," Release 1.0, Dec. 8, 2005.

As another example, a wireless relay network may include a multi-hop system in which end nodes such as mobile stations or subscriber stations (MS/SSs) may be coupled to a base station (BS) or Access Point (AP) via one or more relay stations (RSs). Thus, traffic between MS/SSs and the BS/AP may pass and be processed by the relay stations. The 802.16 Mobile Multi-hop Relay (MMR), referenced in IEEE 802.16 WG, is an example of a set of specifications relating to the relay concept. The MMR specifications include a focus on defining a network system that uses relay stations (RSs) to extend network coverage and/or enhance system throughput. These are a few examples of wireless network specifications, and there are many other technologies and standards being developed.

In a wireless network system without relay stations, a MS/SS may attach to a base station (BS) directly, and therefore, the BS may be aware of the route (i.e., only the one-hop route) to each of the attached MS/SS. However, when a relay station (RS) is introduced between a MS/SS and a BS, the BS may not be able to easily determine a routing path, or communication path between the MS/SS and BS. However, in scenarios such as, for example, centralized scheduling wherein a BS may schedule the resources for traffic transmissions over every segment on a communication path between a MS/SS and the BS, it may be desirable for the BS to be able to obtain or determine information regarding a complete communication path between the MS/SS and the BS. Moreover, it may be desirable for such an obtained or determined communication path to be easily managed and/or updated.

SUMMARY

Various embodiments are disclosed relating to wireless networks, and also relating to topology and route discovery and management in a relay network.

According to an embodiment, a method may include receiving a first message at a first network station in a wireless network. According to an example embodiment, the first message may, for example, include a ranging request message. The method may further include determining whether the received first message includes an identifier of a second network station indicating an attachment of a network node to the second network station. The method may further include modifying the received first message to include an identifier of the first network station indicating an attachment of the network node to the first network station if it is determined that the received message does not include the identifier of the second network station. According to an example embodiment, the received first message may be modified, for example, to include a type/length/value (TLV) field that includes the identifier of the first network station indicating the attachment of the network node to the first network station if it is determined that the received first message does not include an identifier of a second network station. The received first message may be forwarded to a third network station.

According to another embodiment, a method may include receiving a first message at a first network station in a wireless network. According to an example embodiment, the first message may include a ranging request message. The method may further include determining whether the received first message indicates that a network node is attaching to the first network station. The received first message may be forwarded to a second network station. Further, a second message may be sent to the second network station, the second message including an indication that the network node is directly attached to the first network station if it is determined that the received first message indicates that the network node is attaching to the first network station. According to an example embodiment, the second message may include a topology update request message. According to an example embodiment, one or more relay stations may receive the second message and determine the topology and/or a communication path between the base station and the network node that includes the network node based on the second message.

According to another embodiment, a method may include determining that a network node is detaching from a first network station in a wireless network. The method may further include sending a request to a second network station, the request including an indication that the network node is detaching from the first network station.

According to an example embodiment, the request may include a topology update request message. According to an example embodiment, a base station may receive the request and determine a network topology based on the request.

According to another embodiment, a method may include generating a message, at a first network station in a wireless network, the message including one or more identifiers of one or more other network stations indicating that the first network station is attaching to the one or more other network stations. The method may further include sending the message to the one or more other network stations.

According to an example embodiment, the message may include a ranging request message. According to an example embodiment, a base station may receive the message and determine a network topology based on the message.

According to another embodiment, a method may include updating path information associated with a current communication path to indicate an updated communication path between a base station and a network node in a wireless network. The method may further include sending a message indicating the updated communication path to each network node included in one or more of the current communication path or the updated communication path.

According to an example embodiment, each one of the network nodes that receives the message may update local data associated with network communication paths in a storage device associated with the each one of the network nodes based on the received message. According to an example embodiment, the sending the message may include determining a multicast group including each network node included in one or more of the current communication path or the updated communication path, determining a multicast address associated with the multicast group, and sending the message based on the multicast address.

According to another embodiment, a method may include determining that a network node in a wireless network is requesting a connection to a network station included in a first communication path between the network node and a base station. The method may further include determining one or more other communication paths between the network node and the base station. The method may further include selecting one or more selected paths from the first communication path and the one or more other communication paths based on network parameters. According to an example embodiment, the selecting may include selecting one or more selected paths from the first communication path and the one or more other communication paths based on network parameters, wherein the one or more selected paths include an uplink path and a downlink path. The method may further include sending a message indicating one of the selected communication paths to each network station that is included in the one of the selected communication paths.

According to an example embodiment, the sending of the message may include determining a multicast group including each network node included in the one of the selected communication paths, determining a multicast address associated with the multicast group, and sending the message based on the multicast address.

The details of one or more implementations are set forth in the accompanying drawings and the description below. Other features will be apparent from the description and drawings, and from the claims.

DETAILED DESCRIPTION

Figure 1:
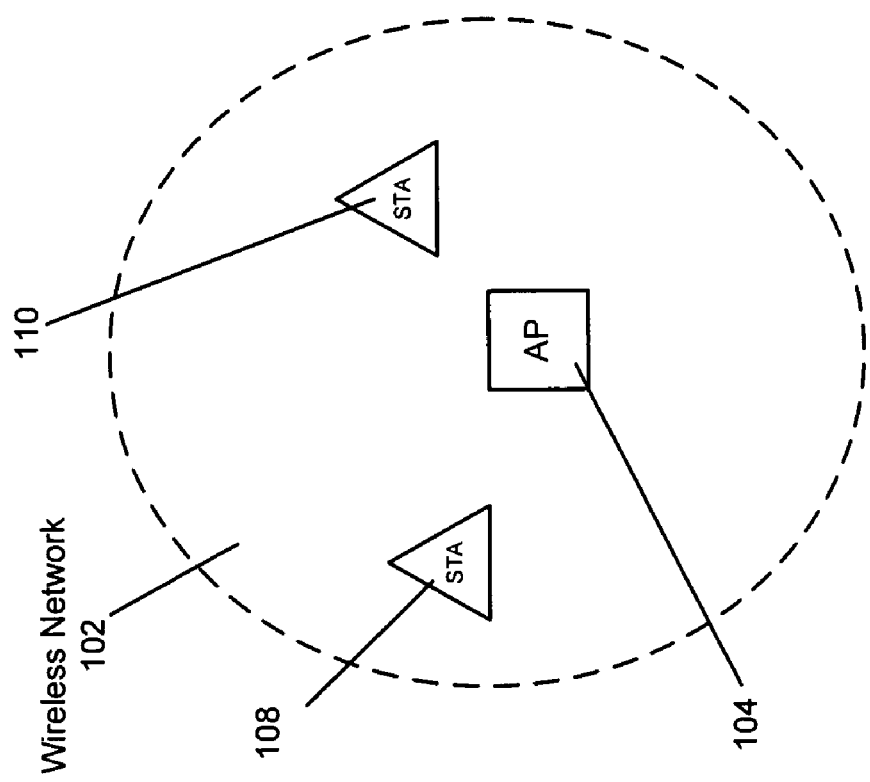
FIG. 1 is a block diagram illustrating a wireless network according to an example embodiment.

Referring to the Figures in which like numerals indicate like elements, FIG. 1 is a block diagram illustrating a wireless network 102 according to an example embodiment. Wireless network 102 may include a number of wireless nodes or stations, such as an access point (AP) 104 or base station and one or more mobile stations or subscriber stations, such as stations 108 and 110. While only one AP and two mobile stations are shown in wireless network 102, any number of APs and stations may be provided. Each station in network 102 (e.g., stations 108, 110) may be in wireless communication with the AP 104, and may even be in direct communication with each other. Although not shown, AP 104 may be coupled to a fixed network, such as a Local Area Network (LAN), Wide Area Network (WAN), the Internet, etc., and may also be coupled to other wireless networks.

Figure 2:
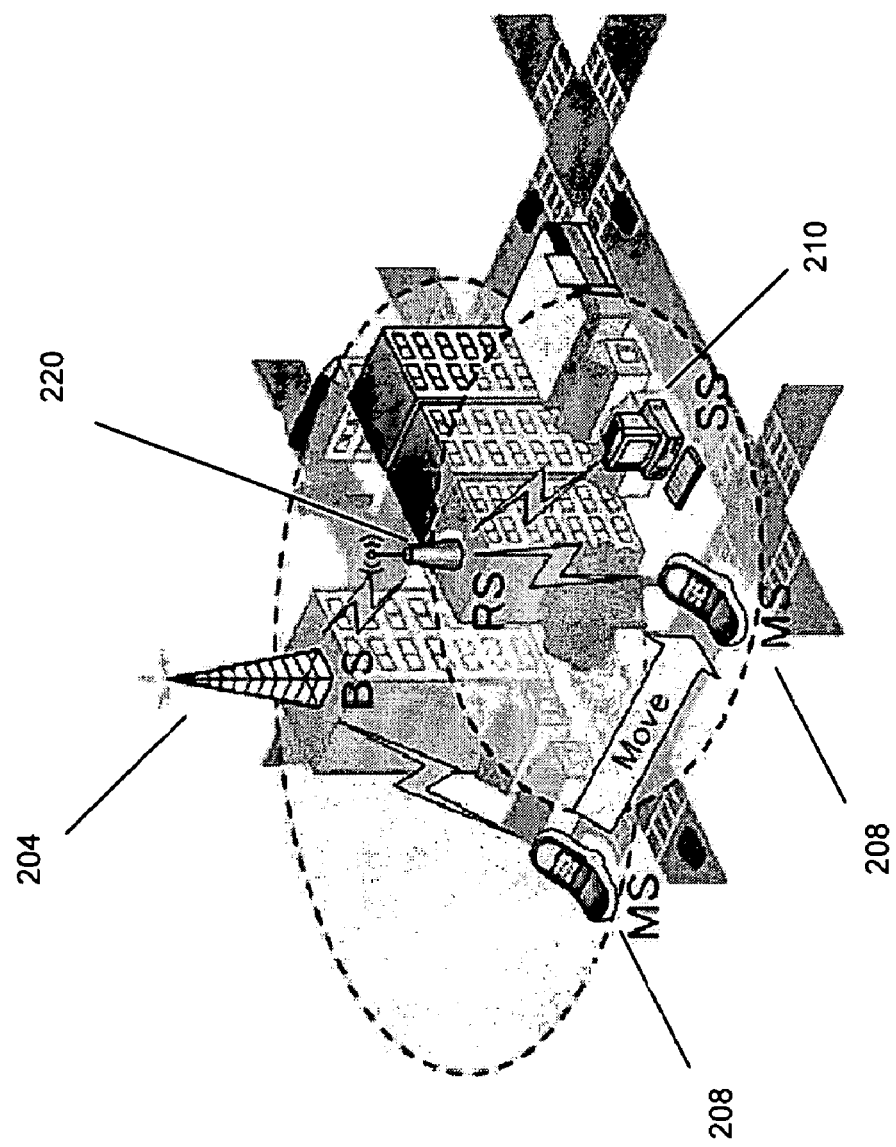
FIG. 2 is a block diagram illustrating a wireless network according to an example embodiment.

FIG. 2 is a block diagram illustrating a wireless network according to an example embodiment. According to an example embodiment, a mobile station MS 208 may initially communicate directly with a base station BS 204, for example, and a subscriber station 210 may communicate with the base station BS 204 via a relay station RS 220. In an example embodiment, the mobile station 208 may travel or move with respect to base station BS 204. For example, the mobile station MS 208 may move out of range of the base station BS 204, and may thus begin communicating with the base station 204 via the relay station 220 as shown in FIG. 2.

Figure 3A:
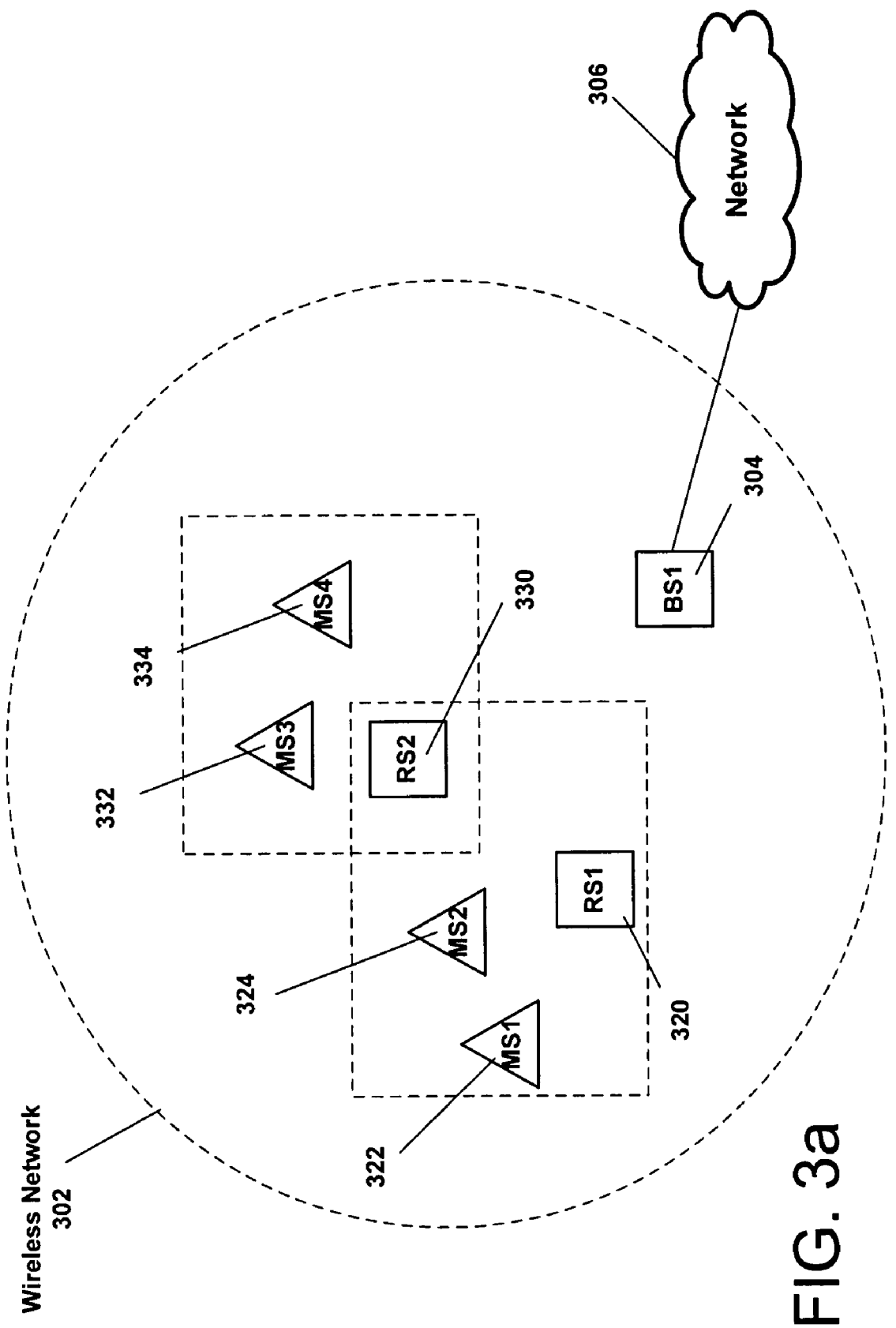
FIG. 3a is a block diagram illustrating a wireless relay network according to an example embodiment.

FIG. 3a is a block diagram illustrating a wireless network 302 according to an example embodiment. Wireless network 302 may include a number of wireless nodes or stations, such as base station BS1 304, relay stations RS1 320 and RS2 330, a group of mobile stations, such as MS1 322 and MS2 324 communicating with relay station RS1 320, and MS3 332 and MS4 334 communicating with relay station RS2 330. As shown, relay station RS2 330 also communicates with relay station RS1 320. While only one base station, two relay stations, and four mobile stations are shown in wireless network 302, any number of base stations, relay stations, and mobile stations may be provided. The base station 304 may be coupled to a fixed network 306, such as a Wide Area Network (WAN), the Internet, etc., and may also be coupled to other wireless networks. The group of stations MS1 322, MS2 324, and RS2 330 may communicate with the base station BS1 304 via the relay station RS1 320. The group of stations MS3 332, MS4 334, may communicate with the base station BS1 304 via the relay station RS2 330, which communicates with the base station BS1 304 via the relay station RS1 320.

Figure 3B:
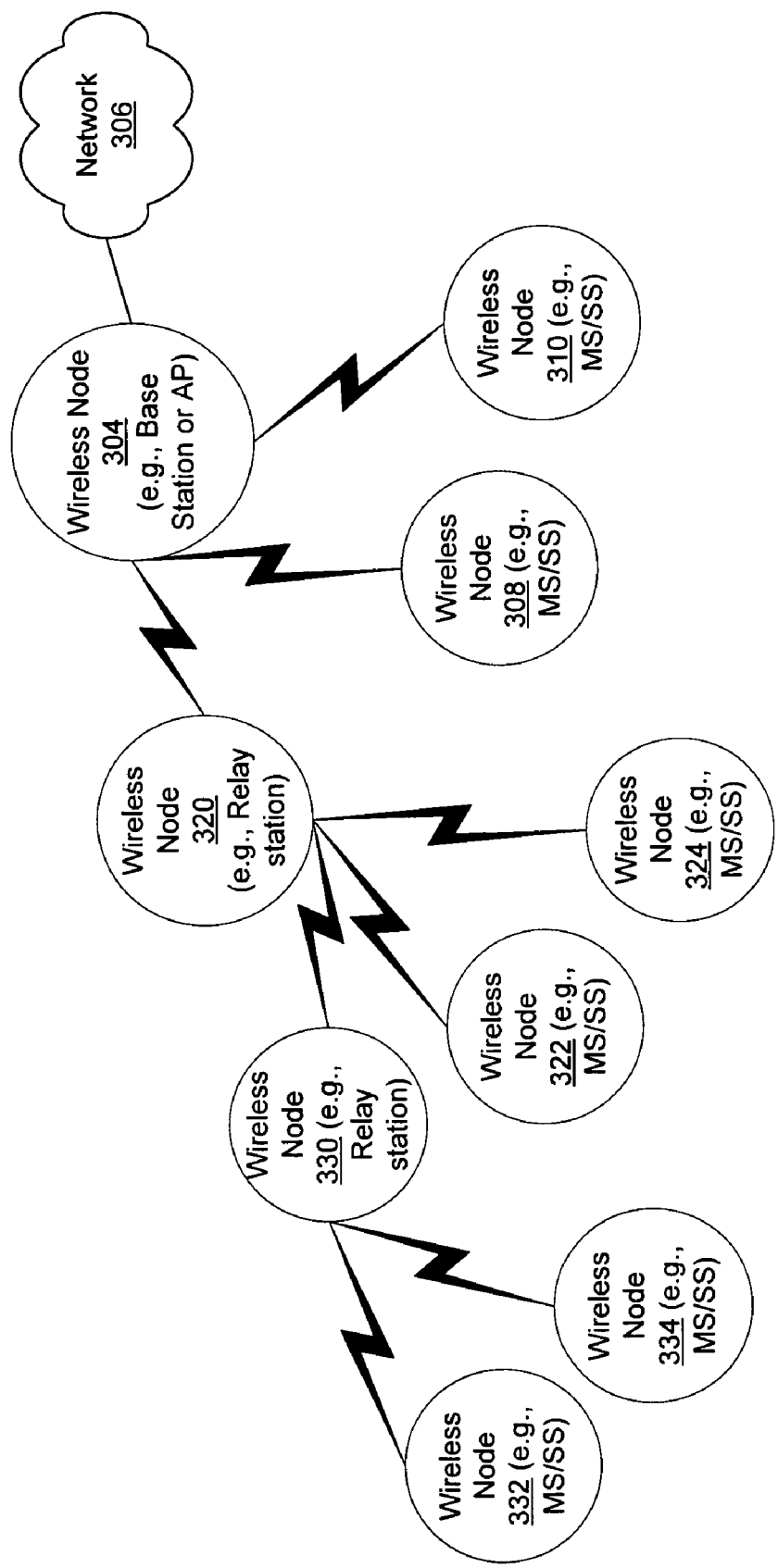
FIG. 3b is a diagram of a multi-hop environment according to an example embodiment.

FIG. 3b is a diagram of a multi-hop environment according to an example embodiment. A group of wireless nodes 332, 334, which may be mobile stations or subscriber stations (MS/SS) may each be coupled via a wireless link to a wireless node 330. As an example, the wireless nodes 332, 334 may include mobile telephones, wireless digital assistants (PDAs), or other types of wireless access devices, or mobile stations. The term "node" or "wireless node" or "network node" or "network station" may refer, for example, to a wireless station, e.g., a subscriber station or mobile station, an access point or base station, a relay station or other intermediate wireless node, or other wireless computing device, as examples. Wireless node 330 may include, for example, a relay station or other node. Wireless node 330 and other wireless nodes 322, 324 may each be coupled to a wireless node 320 via a wireless link. Wireless node 320 and other wireless nodes 308, 310 may each may be coupled to a wireless node 304 via a wireless link. Wireless node 304 may be, for example, a base station (BS), access point (AP) or other wireless node. Wireless node 304 may be coupled to a fixed network, such as network 306, for example. Frames or data flowing from nodes 332, 334 to 330, 322 324, and 330 to 320, and 308, 310, 320 to node 304 may be referred to as flowing in the uplink (UL) or upstream direction, whereas frames flowing from node 304 to nodes 308, 310, and to node 320 and then to nodes 330, 322, 324, 332, and 334 may be referred to as flowing in the downlink (DL) or downstream direction, for example.

Figure 4A:
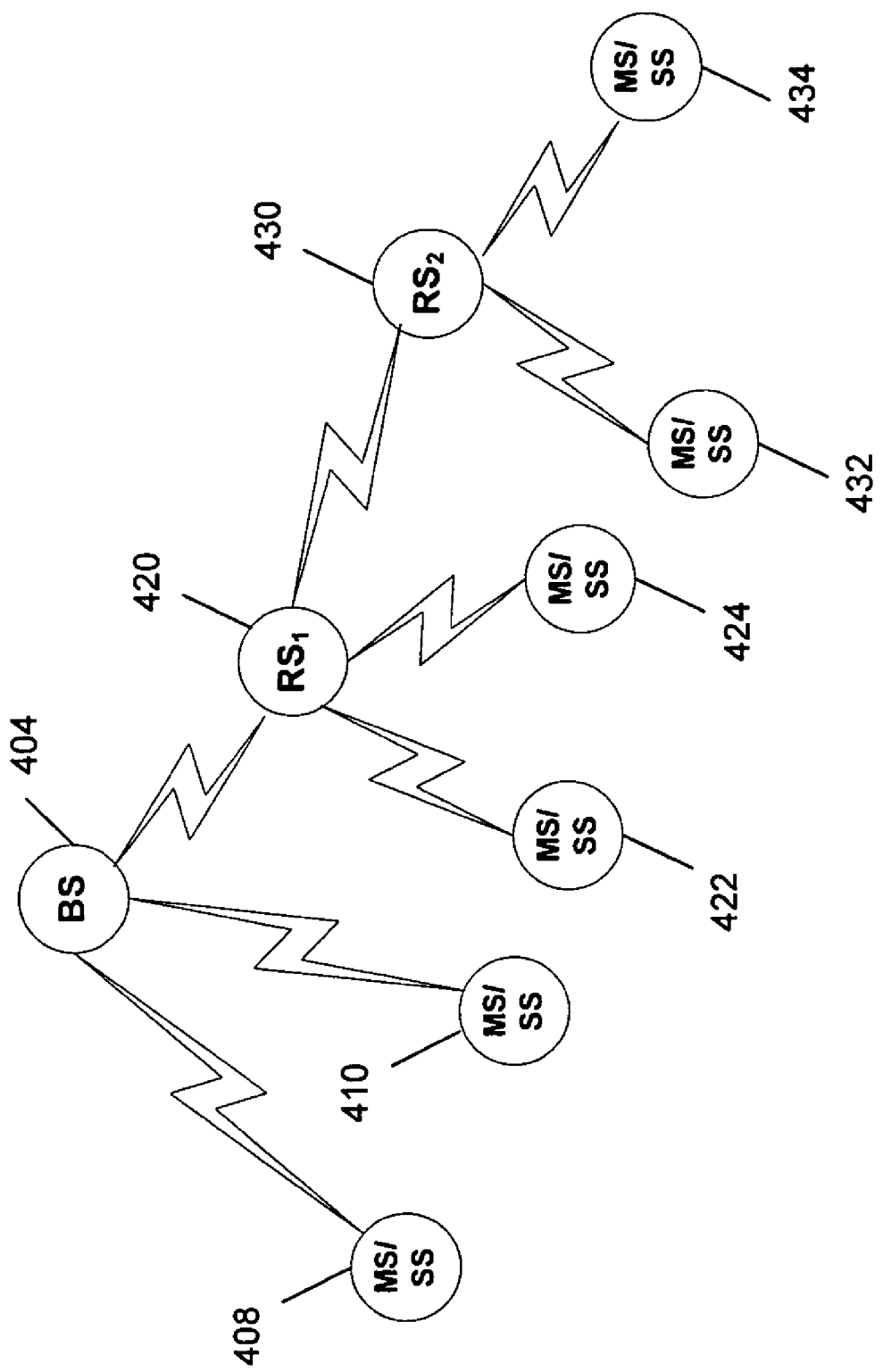
FIGS. 4a-4b are block diagrams illustrating wireless relay networks according to example embodiments.
Figure 4B:
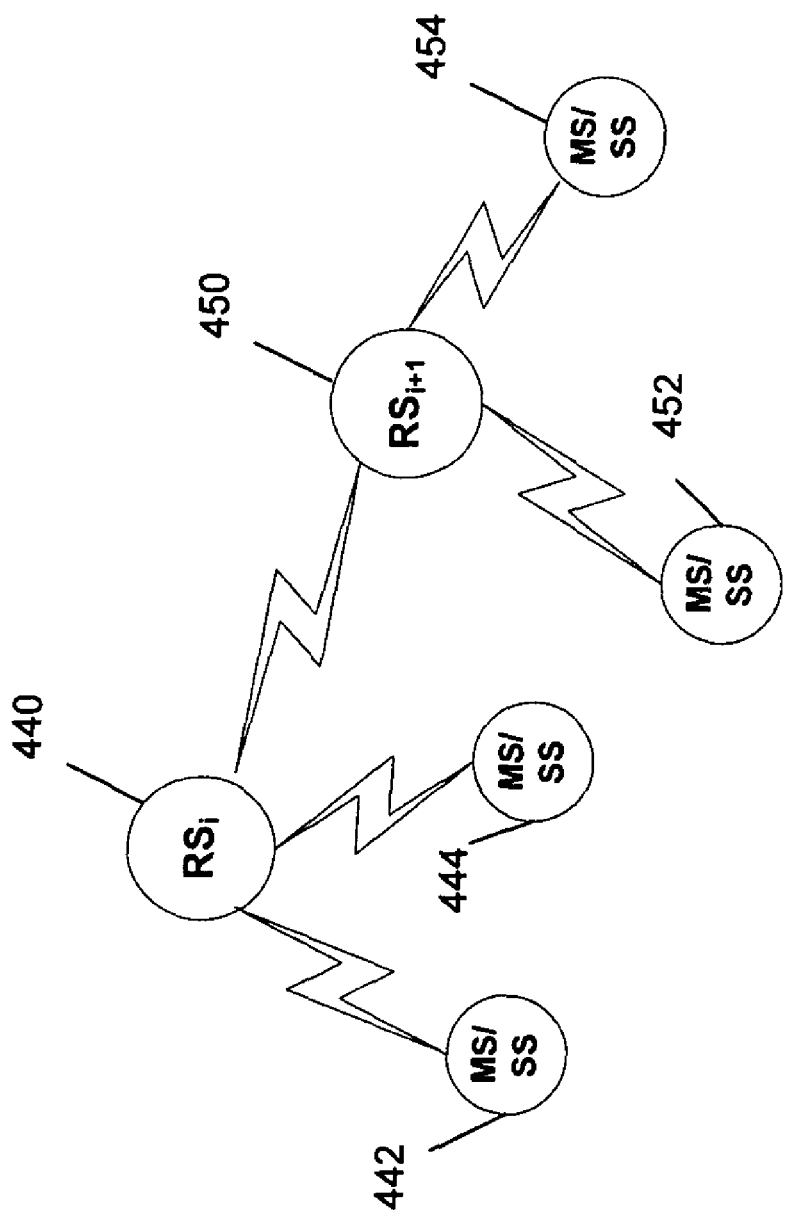

FIGS. 4a-4b are block diagrams illustrating wireless relay networks according to example embodiments. According to an example embodiment, an example relay network may include n levels of RSs. As an example, a two-level-relay-station architecture is illustrated in FIG. 4a. Thus, as shown in the example, MS/SS 408, MS/SS 410, and RS1 420 are coupled to, or directly attached to a base station BS 404.

Similarly, as shown in the example, MS/SS 422, MS/SS 424, and RS2 430 are coupled to, or directly attached to the RS1 420. Further, as shown in the example, MS/SS 432 and MS/SS 434 are coupled to, or directly attached to the relay station RS2 430. The term "attach" may, for example, refer to connecting to a network system or network node over a link, for example, a node may attach to a network system or another node by directly coupling with the other node. The term "attachment" may thus, for example, refer to a connection to a network system or network node over a link, for example, via a direct coupling between network nodes. Generally, a node may attach or connect to a system in order to obtain service from the system via another node.

For the generic example as shown, a wireless node indicated as $RS_0$ may include a base station. According to an example embodiment, one or more relay stations, for example, $RS_i$ 440, $RS_{i+1}$ 450 may receive data units and forward the data units to the next level of the wireless relay network.

Figure 5B:
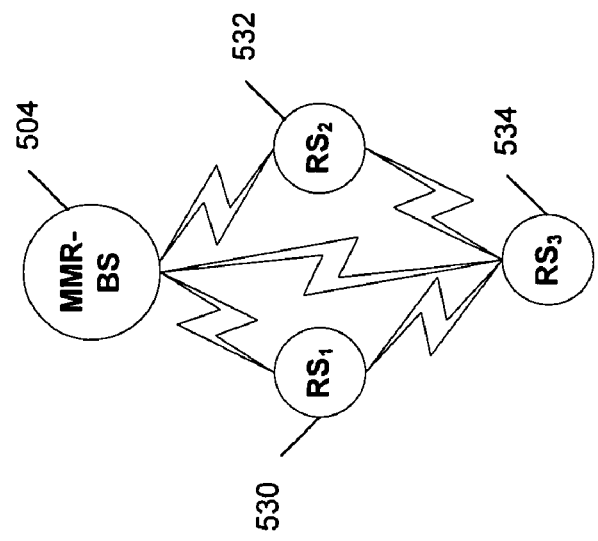
FIGS. 5a-5b are block diagrams illustrating wireless relay networks according to example embodiments.
Figure 5A:
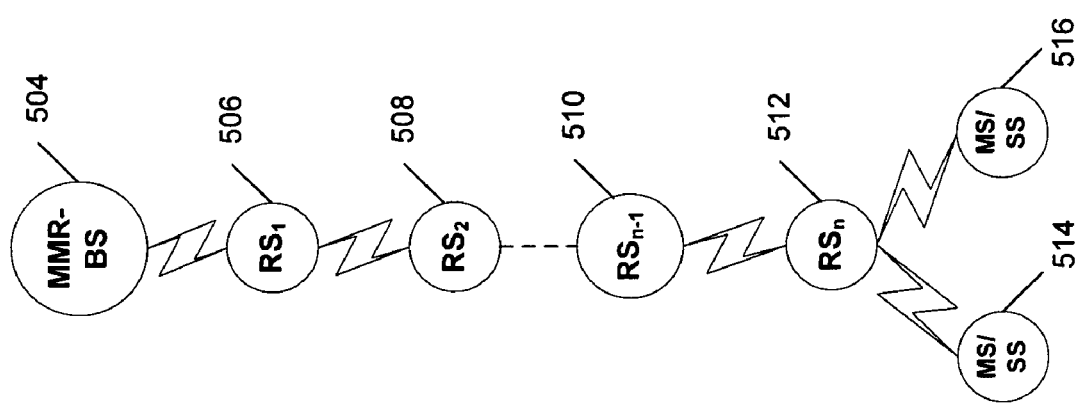

FIGS. 5a-5b are block diagrams illustrating wireless relay networks according to example embodiments. As shown in FIG. 5a, a Mobile Multi-hop Relay base station (MMR-BS) 504 may have a relay station, for example, $RS_1$ 506, directly coupled, or directly attached to MMR-BS 504. Further, as shown, a relay station, for example, $RS_2$ 508 may be directly attached to $RS_1$ 506. Other intermediate network nodes may be included in a communication path between a relay station $RS_{n-1}$ 510 and $RS_2$ 508. Additionally, a relay station $RS_n$ 512 may be attached to $RS_{n-1}$ 510. Multi-hop subscriber stations, for example, MS/SS 514, 516 may be attached to $RS_n$ 512. Thus, as shown in FIG. 5a, there may exist communication paths, for example, between MMR-BS 504 and MS/SS 514 and between MMR-BS 504 and MS/SS 516. For example, a communication path between MMR-BS 504 and MS/SS 514 may include MMR-BS 504, $RS_1$ 506, $RS_2$ 508, $RS_{n-1}$ 510, $RS_n$ 512, and all network nodes in a communication path between $RS_2$ 508 and $RS_{n-1}$ 510. As another example, a communication path between MMR-BS 504 and MS/SS 516 may include MMR-BS 504, $RS_1$ 506, $RS_2$ 508, $RS_{n-1}$ 510, $RS_n$ 512, and all network nodes in a communication path between $RS_2$ 508 and $RS_{n-1}$ 510. The MS/SS 514, 516 may also include mobile stations.

As shown in FIG. 5b, a relay station, for example, $RS_3$ 534 may be directly attached to multiple network nodes, for example, relay stations $RS_1$ 530, $RS_2$ 532, which may both be directly attached to a base station, for example, MMR-BS 504. Thus, for the example shown in FIG. 5b, there may exist two or more communication paths between MMR-BS 504 and $RS_3$ 534: for example, a communication path that includes MMR-BS 504, $RS_1$ 530, and $RS_3$ 534, and a communication path that includes MMR-BS 504, $RS_2$ 532, and $RS_3$ 534. For example, one of the communication paths may include an uplink (UL) communication path between MMR-BS 504 and $RS_3$ 534 and another may include a downlink (DL) communication path between MMR-BS 504 and $RS_3$ 534.

The various example embodiments described herein may be applicable to a wide variety of networks and technologies, such as WLAN networks (e.g., IEEE 802.11 type networks), IEEE 802.16 WiMAX networks, 802.16 Mobile Multi-hop Relay (MMR) networks, as referenced in IEEE 802.16 WG, WiMedia networks, Ultra Wide Band networks, cellular networks, radio networks, or other wireless networks. In another example embodiment, the various examples and embodiments may be applied, for example, to a mesh wireless network, where a plurality of mesh points (e.g., Access Points) may be coupled together via wired or wireless links. The various example embodiments described herein may be applied to wireless networks, both in an infrastructure mode where an AP or base station may communicate with a station (e.g., communication occurs through APs), as well as an ad-hoc mode in which wireless stations may communicate directly via a peer-to-peer network, for example.

A wireless relay network may be an example of a multi-hop system in which end nodes, for example, mobile stations or subscriber stations (MS/SS), may be connected to a base station via one or more relay stations, such as RS1 320 and RS2 330, for example. Traffic between the mobile stations or subscriber stations and the base station may pass through, and be processed by, the relay stations RS1 320 and RS2 330, for example. As an example, a relay station may be used to extend the network coverage and/or enhance the system throughput. For example, the traffic sent from a relay station may be scheduled by the relay station itself or scheduled by the base station instead. In some cases, a relay station may receive and decode a frame from a base station, and then forward the frame to the respective mobile station or subscriber station.

The term "wireless node" or "network station" or "node," or the like, may include, for example, a wireless station, such as a mobile station or subscriber station, an access point (AP) or base station, a relay station, a wireless personal digital assistant (PDA), a cell phone, an 802.11 WLAN phone, a WiMedia device, a WiMAX device, a wireless mesh point, or any other wireless device. These are merely a few examples of the wireless devices and technologies that may be used to implement the various example embodiments described herein, and this disclosure is not limited thereto.

In a wireless network system without relay stations, a MS/SS may attach to a base station (BS) directly, and therefore, the BS is aware of the route (i.e., only the one-hop route) to each of the attached MS/SS. However, when a relay station (RS) is introduced between a MS/SS and a BS, an initial attachment request, e.g., a Ranging Request (RNG-REQ) in accordance with IEEE 802.16, may be sent from the MS/SS to the BS through one or more RSs. If there are two or more RSs on the path between a MS/SS and a BS, e.g., as discussed regarding MMR-BS 504, $RS_1$ 506, . . . , $RS_n$ 512, MS/SS 514 with regard to FIG. 5a, then upon receiving the initial attachment request, the BS, e.g., MMR-BS 504 may be able to determine the last RS, e.g., $RS_1$ 506, on the path from the MS/SS 514 to the MMR-BS 504 as shown in FIG. 5a, but not all the other RSs on the path. Thus the BS, e.g., MMR-BS 504 may not be able to obtain the topology as well as the routing path between the MS/SS, e.g., MS/SS 514 and the BS, e.g., MMR-BS 504.

However, in scenarios such as, e.g., centralized scheduling wherein a BS may schedule the resources for traffic transmissions over every segment on the path between a MS/SS and the BS, the BS may need to determine an exact path between a MS/SS and the BS. If the BS is able to determine the exact path, then as a result of determining a route between the MS/SS and the BS, the BS may determine information relating to the number of hops, the radio condition, etc., on each path. Such information may be used, for example, for the BS to determine scheduling algorithms during regular traffic sessions or during handover.

According to an example embodiment, when a RS, e.g., $RS_1$ 506 as shown in FIG. 5a, attaches directly to a BS, e.g., MMR-BS 504, the BS may record the path to the RS as a direct link. For example, the BS may store information associated with the path as network topology information, for example, in a storage device associated with the BS.

The term "network topology" may refer, for example, to a pattern of links connecting pairs of nodes of a network. Thus, a given node may have one or more links to other nodes, and the links may appear in a variety of different shapes. For example, a simple connection may include a one-way link between two devices. More generally, the term "network topology" or "topology" may be used to describe a configuration of a computer network. Thus, for example, each of FIGS. 1-5b may be understood to represent various network topologies.

When a RS, e.g., $RS_2$ 508 in FIG. 5a, acting as a MS/SS attaches to the system, e.g., via $RS_1$ 506, e.g., by a direct coupling with $RS_1$ 506, $RS_2$ 508 may send an attachment request, for example, via a ranging request message. Upon receiving the attachment request, $RS_1$ 506, e.g., may stamp its signature, e.g., a RS identifier associated with $RS_1$ 506, to the attachment request and may forward the modified attachment request to the BS, e.g., the MMR-BS 504. Upon receiving the attachment request from $RS_2$ 508 with the signature of $RS_1$ 506, the BS, e.g., MMR-BS 504, may determine that $RS_2$ 508 is attached to the system via $RS_1$ 506. Since MMR-BS 504 may have already determined the route between MMR-BS 504 and $RS_1$ 506, e.g., as a result of the $RS_1$ 506 attachment process, MMR-BS 504 may determine the topology and/or a path between MMR-BS 504 and $RS_2$ 508. The BS, e.g., MMR-BS 504 may then update its network topology information, e.g., to indicate a communication path between MMR-BS 504 and $RS_2$ 508 that includes $RS_1$ 506.

According to an example embodiment, this technique may be extended as other network nodes attach to network nodes in the current network topology. Thus, when a RS, e.g., $RS_n$ 512 in FIG. 5a2, acting as a MS/SS, attaches to the system, e.g., via $RS_{n-1}$ 510, $RS_n$ 512 may send an attachment request, for example, via a ranging request message. Upon receiving the attachment request, $RS_{n-1}$ 510 may stamp its signature to the attachment request and forward the modified attachment request to the BS, e.g., MMR-BS 504. Any other RSs beyond $RS_{n-1}$ in the relevant communication path may simply forward the modified attachment request to the next hop. Upon receiving the modified attachment request from $RS_n$ 512 with the signature of $RS_{n-1}$ 510 (e.g., an RS-ID associated with $RS_{n-1}$ 510), the BS, MMR-BS 504 may determine that $RS_n$ 512 is attached to the system via $RS_{n-1}$ 510. Since MMR-BS 504 may have already determined the route between the MMR-BS 504 and $RS_{n-1}$ 510, e.g., as a result of the $RS_{n-1}$ 512 attachment process, MMR-BS 504 may determine the topology and/or a path between MMR-BS 504 and $RS_n$ 512. MMR-BS 504 may then update the network topology information to indicate a communication path between MMR-BS 504 and $RS_n$ 512.

When a MS/SS, e.g., MS/SS 514 attaches to the system via $RS_n$ 512, the MS/SS 514 may send an attachment request, for example, via a ranging request message. Upon receiving the attachment request, $RS_n$ 512 may stamp its signature (e.g., an RS-ID associated with $RS_n$ 512) to the attachment request and forward the modified attachment request to the BS, e.g., MMR-BS 504. Any other RSs beyond $RS_n$ 512 (e.g., $RS_{n-1}$ 510, $RS_2$ 508, $RS_1$ 506) may simply forward the modified attachment request to the next hop. Upon receiving the modified attachment request from the MS/SS 514 with the signature of $RS_n$ 512, the BS, e.g., MMR-BS 504 may determine that the MS/SS 514 is attached to the system via $RS_n$ 512. Since the MMR-BS 504 may have already determined the route, e.g., communication path, between the MMR-BS 504 and $RS_n$ 512, e.g., as a result of the $RS_n$ 512 attachment process, the MMR-BS 504 may determine the topology and/or a route or communication path between the MMR-BS 504 and MS/SS 514. MMR-BS 504 may then update the network topology information to indicate the communication path between MMR-BS 504 and MS/SS 514.

According to an example embodiment, a signature or stamp of a RS may include, for example, a RS-ID or other form of identity that may uniquely identify the RS. According to an example embodiment, the attachment request may include a ranging request (RNG-REQ) message. According to an example embodiment, the signature or stamp of the RS may be added to a received RNG-REQ message, e.g., by adding to the RNG-REQ message a TLV field including an RS-ID before forwarding the modified RNG-REQ message to the next hop toward the MMR-BS 504.

The techniques described herein may be used in accordance with an IEEE 802.16 system, wherein the attachment request may include, for example, a ranging request (RNG-REQ) message as specified by IEEE 802.16, with enhancements including the RS signature. However, it is understood that the techniques described herein may apply to any type of network system, including network systems other than IEEE 802.16 network systems.

A ranging request (RNG-REQ) message, for example as specified by IEEE 802.16, may be transmitted by a MS/SS at initialization and periodically, for example, to determine network delay and to request power and/or a downlink burst profile change. The RNG-REQ message may be sent, for example, in initial ranging and data grant intervals.

An example format of an example ranging request message is shown in Table 1 below.

TABLE 1

Example RNG-REQ message format

| Syntax | Size | Notes |
| --- | --- | --- |
| RNG-REQ( ) { | | |
|   Management Message Type = 4 | 8 bits | |
|   Downlink Channel ID | 8 bits | |
|   TLV Encoded Information | variable | TLV specific |
| } | | |

As shown, a RNG-REQ message may include type/length/value (TLV) fields. According to an example embodiment, a TLV field may include an RS-ID TLV field, which may include an identifier associated with a RS. It is understood that a format of a RNG-REQ message may differ from the format shown in Table 1 without diverging from the scope of the present discussion.

A type/length/value (TLV) scheme, for example as specified by IEEE 802.16 generally, may include a formatting scheme that adds a tag to each transmitted parameter that includes the parameter type (and implicitly the encoding rules) and the length of the encoded parameter.

However, according to an example embodiment, the identification of the RS discussed previously may be encoded as a TLV field included in a RNG-REQ message that is being transmitted to a base station.

A ranging response (RNG-RSP) message, for example as specified by IEEE 802.16 generally, may be transmitted by a BS in response to a received RNG-REQ message. In addition, it may be transmitted asynchronously to send corrections based on measurements that have been made on other received data or medium access control (MAC) messages. As a result, an MS/SS may be prepared to receive a RNG-RSP message at any time, not just following a RNG-REQ transmission.

An example format of an example ranging response message is shown in Table 2 below.

TABLE 2

Example RNG-RSP message format

| Syntax | Size | Notes |
| --- | --- | --- |
| RNG-RSP( ) { | | |
| Management Message Type = 5 | 8 bits | |
| Uplink Channel ID | 8 bits | |
| TLV Encoded Information | variable | TLV specific |
| } | | |

As shown, the RNG-RSP message may also include TLV fields. An example RNG-RSP message may include, for example, timing adjust information, power adjust information, a basic connection identifier (CID) for initial ranging, a subscriber station (SS) medium access control (MAC) address for initial ranging, frequency adjust information, etc.

Thus, for example, when a MS/SS or RS conducts initial ranging, it may send an initial ranging request (RNG-REQ) message. According to an example embodiment, when a RS receives a RNG-REQ without an attached-RS-ID TLV field, the RS may stamp its signature, for example, by including its associated RS-ID in an attached-RS-ID TLV field and inserting the attached-RS-ID TLV field into the RNG-REQ message. It may then forward the modified RNG-REQ message to the next hop.

When a RS receives a RNG-REQ message with an attached-RS-ID TLV field, it may simply forward the RNG-REQ message to the next hop. When a MMR-BS receives a RNG-REQ message without an attached-RS-ID TLV field from a MS/SS or RS ($RS_i$), the MMR-BS may determine that the MS/SS or $RS_i$ sending the RNG-REQ message is directly attaching to the MMR-BS itself and is only one hop away. The MMR-BS may then update its network topology information to indicate that the attaching MS/SS or RS ($RS_i$) is directly attached to the MMR-BS. Thus, a communication between the MMR-BS and the attaching MS/SS or RS ($RS_i$) may be established and information relating to the communication path may be included as part of updating the network topology information.

According to an example embodiment, when a MMR-BS receives a RNG-REQ message with an attached-RS-ID field from a MS/SS or RS ($RS_i$), the MMR-BS may retrieve the RS-ID included in the attached-RS-ID TLV field and determine that the MS/SS or RS ($RS_i$) sending the RNG-REQ message is attaching to the system by directly coupling with the RS ($RS_k$) identified by the RS-ID. Since the MMR-BS may have already determined a communication path between $RS_k$ and itself using the same mechanism as discussed previously, the MMR-BS may determine the topology and/or a route or communication path between the MS/SS or $RS_i$ and the MMR-BS, for example, by combining the already-determined MMR-BS-to-$RS_k$ path with the single hop path between $RS_k$ and the MS/SS or $RS_i$. The MMR-BS may thus update its network topology information in accordance with the updated communication path.

According to an example embodiment, operations of updating network topology information may also be performed locally by each $RS_i$ along the route or communication path as the RNG-REQ message is received and forwarded by the respective $RS_i$ at each hop of the route or communication path from the attaching MS/SS or $RS_i$ to the MMR-BS. Thus, according to an example embodiment, each $RS_i$ may also maintain network topology information associated with traffic flowing through the respective $RS_i$.

According to an example embodiment, TLV fields may only be included in RNG-REQ message of adequate UL bandwidth. Thus, for example, according to MMR specifications, when a MS/SS or RS ($RS_i$) transmits an initial ranging request (RNG-REQ) message, the BS may provide for extra UL bandwidth allocation of size at least sufficient for the RS ($RS_j$) to which the MS/SS or $RS_i$ is directly attaching to insert an attached-RS-ID TLV field into the RNG-REQ message.

According to an example embodiment, an attached-RS-ID may be added to the RNG-REQ message by the first RS ($RS_j$) to which a MS/SS or a RS ($RS_i$) directly attaches when the MS/SS or the RS ($RS_i$) is attempting to perform initial entry, re-entry, association or handover to the network via a RS ($RS_j$).

Figure 6:
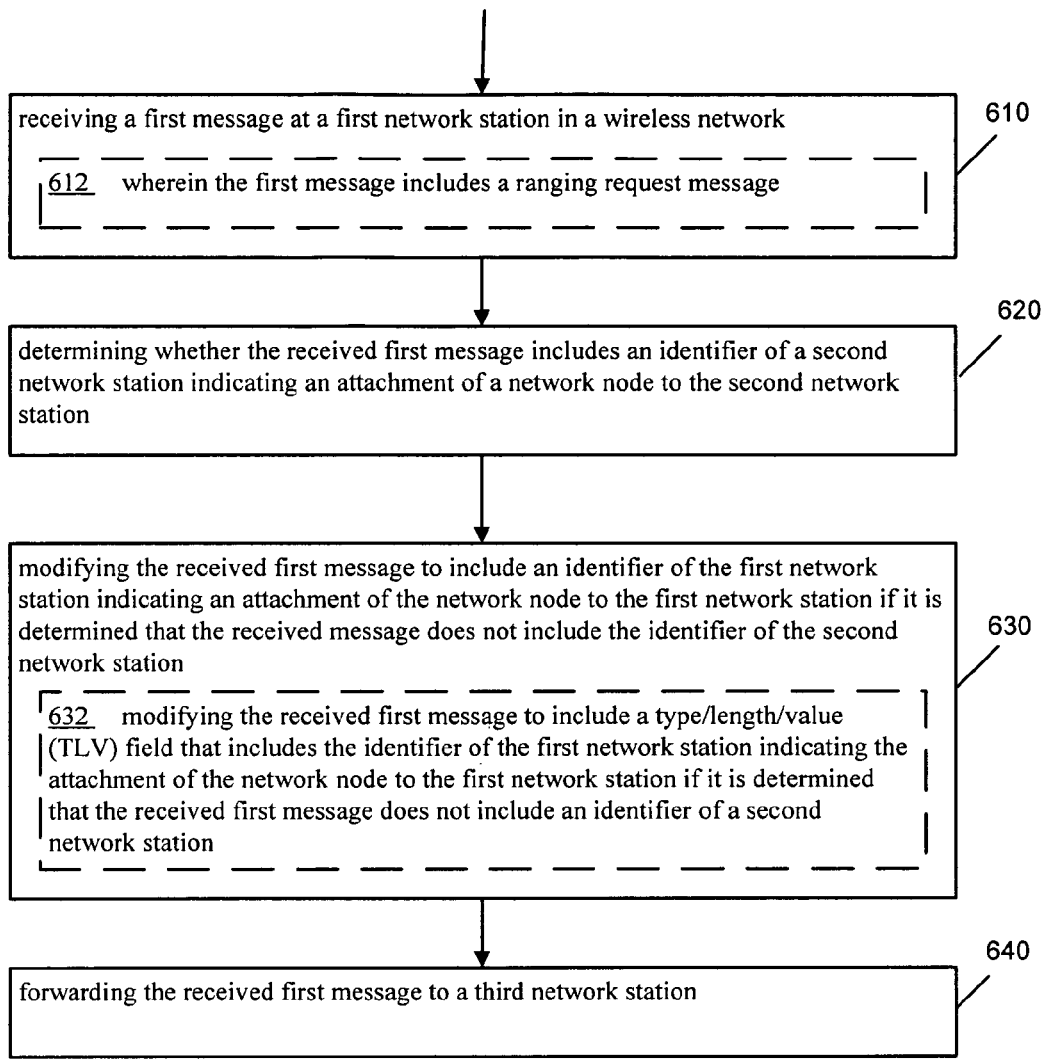
FIG. 6 is a flow chart illustrating operation of a wireless node according to an example embodiment.

FIG. 6 is a flow chart illustrating operation of a wireless node according to an example embodiment. At 610, a first message may be received at a first network station in a wireless network. According to an example embodiment, the first message may, for example, include a ranging request message (610). For example, as discussed previously, $RS_{n-1}$ 510 may receive a RNG-REQ message that may have been sent from $RS_n$ 512 of FIG. 5a.

At 620, it may be determined whether the received first message includes an identifier of a second network station indicating an attachment of a network node to the second network station. For example, $RS_{n-1}$ 510 may determine whether a RNG-REQ message that has been received by $RS_{n-1}$ 510 includes, for example, a RS-ID, for example, in the format of a TLV field included in the RNG-REQ message. For example, the received first message may include any other type of message that may include any type of identifier of the second network station, and is not limited to RNG-REQ messages, nor is it limited to IEEE 802.16 type messages. For example, $RS_{n-1}$ 510 may determine whether a RNG-REQ message that has been received by $RS_{n-1}$ 510 includes, for example, a RS-ID, for example, a RS-ID associated with $RS_n$ 512.

At 630, the received first message may be modified to include an identifier of the first network station indicating an attachment of the network node to the first network station if it is determined that the received message does not include the identifier of the second network station. For example, if $RS_{n-1}$ 510 determines that a received RNG-REQ message does not include a RS-ID, then the RNG-REQ message may be modified to include a RS-ID, for example, an identifier associated with $RS_{n-1}$ 510. Thus the modified RNG-REQ message may serve to indicate, for example, that $RS_n$ 512 is attaching to $RS_{n-1}$ 510.

According to an example embodiment, the received first message may be modified, for example, to include a type/length/value (TLV) field that includes the identifier of the first network station indicating the attachment of the network node to the first network station if it is determined that the received first message does not include an identifier of a second network station (632). At 640, the received first message may be forwarded to a third network station. This, for example, $RS_{n-1}$ 510 may forward the received first message. If $RS_{n-1}$ 510 has not modified the received first message, then $RS_{n-1}$ 510 may forward the first message in the same status as it was received by $RS_{n-1}$ 510. However, if $RS_{n-1}$ 510 has modified the received first message, then $RS_{n-1}$ 510 may forward the first message in its modified form.

As discussed previously, the received first message may then be received and forwarded, for example, by all other RSs on a communication path from $RS_{n-1}$ 510 to MMR-BS 504 (e.g., $RS_2$ 508, $RS_1$ 506). As discussed previously, MMR-BS 504 may receive the received first message and may update the network topology information based on the received first message. According to an example embodiment, all $RS_i$ along the communication path may update local network topology information based on the received first message as the received first message is received and forwarded by each respective RSi along the communication path or route.

Alternatively, according to another example embodiment, upon receiving a RNG-REQ message from a new MS/SS or RS ($RS_i$), an RS, e.g., $RS_j$ may forward the RNG-REQ message to the next hop, and may send a topology update request (Topology-Update-REQ) message to an MMR-BS to inform the MMR-BS that a new MS/SS or RS ($RS_i$) is attaching to the system via $RS_j$. The MMR-BS may update the network topology information or structure based on such information, as well as on the information it receives before receiving the Topology-Update-REQ message.

According to an example embodiment, the Topology-Update-REQ message may be formatted, for example, in accordance with the example format as shown in Table 3 below. The MMR-BS may then, for example, send a Topology-Update-RSP message to $RS_j$. According to an example embodiment, the Topology-Update-RSP message may be formatted, for example, in accordance with the example format as shown in Table 4 below.

Thus, according to an example embodiment, when a relay station, e.g., $RS_1$ 506 attaches directly to a MMR-BS, e.g., MMR-BS 504, the MMR-BS 504 may record the path to $RS_1$ 506 as a direct link. When another relay station, e.g., $RS_2$ 508 acting as a MS/SS attaches to the system via $RS_1$ 506, e.g., by sending a RNG-REQ message, $RS_1$ 506 may send a topology update request (Topology-Update-REQ) message to the MMR-BS 504 to inform the MMR-BS 504 that $RS_2$ 508 attaches to the system via $RS_1$ 506. Since the MMR-BS 504 may have already determined the topology between MMR-BS 504 and $RS_1$ 506 during a $RS_1$ 506 initial ranging process, the MMR-BS 504 may determine a topology between $RS_2$ 508 and itself.

Continuing in this manner, according to an example embodiment, when a MS/SS or RS attaches to the system, e.g., via a direct coupling with $RS_n$, the MS/SS or RS may send its initial RNG-REQ message. Upon receiving the RNG-REQ message, $RS_n$ may send a Topology-Update-REQ message to the MMR-BS to inform the MMR-BS that the MS/SS or RS attaches to the system via $RS_n$ (e.g., via a direct coupling with $RS_n$). Since the MMR-BS may have already determined the topology between the MMR-BS and $RS_n$ during a $RS_n$ initial ranging process, the MMR-BS may determine the topology between the MS/SS or RS and itself.

Figure 7:
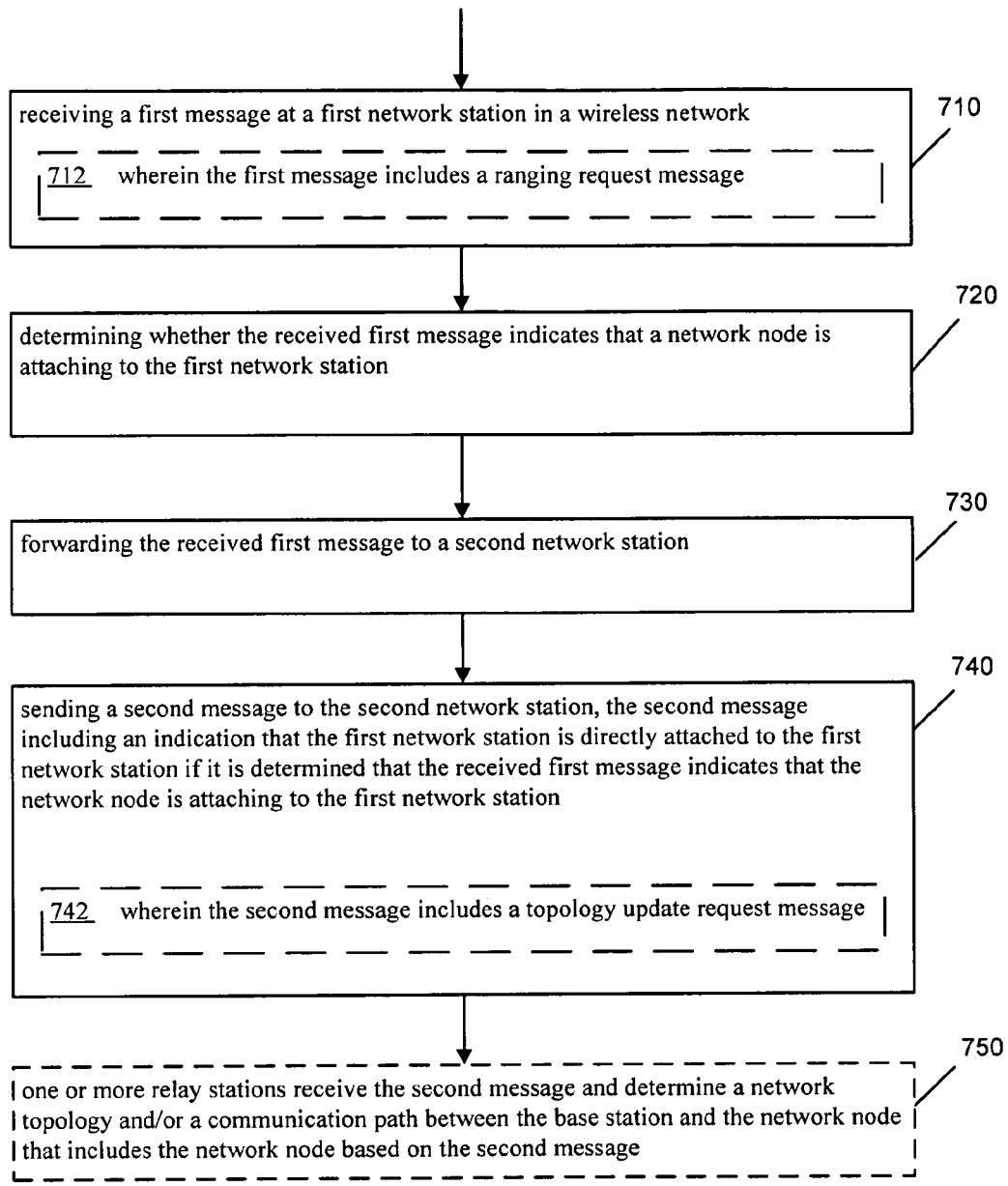
FIG. 7 is a flow chart illustrating operation of a wireless node according to an example embodiment.

FIG. 7 is a flow chart illustrating operation of a wireless node according to an example embodiment. At 710, a first message may be received at a first network station in a wireless network. According to an example embodiment, the first message may include, for example, a ranging request message (712). At 720, it may be determined whether the received first message indicates that a network node is attaching to the first network station. At 730, the received first message may be forwarded to a second network station.

At 740, a second message may be sent to the second network station, the second message including an indication that the network node is directly attached to the first network station if it is determined that the received first message indicates that the network node is attaching to the first network station. According to an example embodiment, the second message, for example, may include a topology update request message (742).

According to an example embodiment, one or more relay stations may receive the second message and determine the topology and/or a communication path between the base station and the network node that includes the network node based on the second message (750).

Similarly, according to an example embodiment, when a directly attached MS/SS or RS ($RS_i$) detaches, for example, terminates an attachment, from a RS ($RS_j$), for example, due to events such as mobility, the RS ($RS_j$) may send a topology update request (Topology-Update-REQ) message to the MMR-BS to inform the MMR-BS that the MS/SS or RS ($RS_i$) is detaching from the system via $RS_j$. Thus, the RS ($RS_j$) may send a Topology-Update-REQ message to the MMR-BS to inform the MMR-BS of the topology change in accordance with the example format as shown in Table 3. Upon receiving the message, the MMR-BS may update the network topology accordingly.

TABLE 3

Example Topology-Update-REQ message format

| Syntax | Size |
|---|---|
| Topology-Update-REQ( ) { | |
| Management Message Type | 8 bits |
| Transaction ID | 16 bits |
| TLV Encoded Information | Variable |
| } | |

An example Topology-Update-REQ message may include an MS/SS or RS ID TLV field and/or an Update Type (attach or detach) TLV field.

Upon receiving a Topology-Update-REQ message from a RS, the MMR-BS may update the network topology accordingly and may reply, for example, with a topology update response (Topology-Update-RSP) message, for example, in accordance with the example format shown in Table 4.

TABLE 4

Example Topology-Update-RSP message format

| Syntax | Size |
|---|---|
| Topology-Update-RSP( ) { | |
| Management Message Type | 8 bits |
| Transaction ID | 16 bits |
| Confirmation Code | 8 bits |
| } | |

Figure 8:
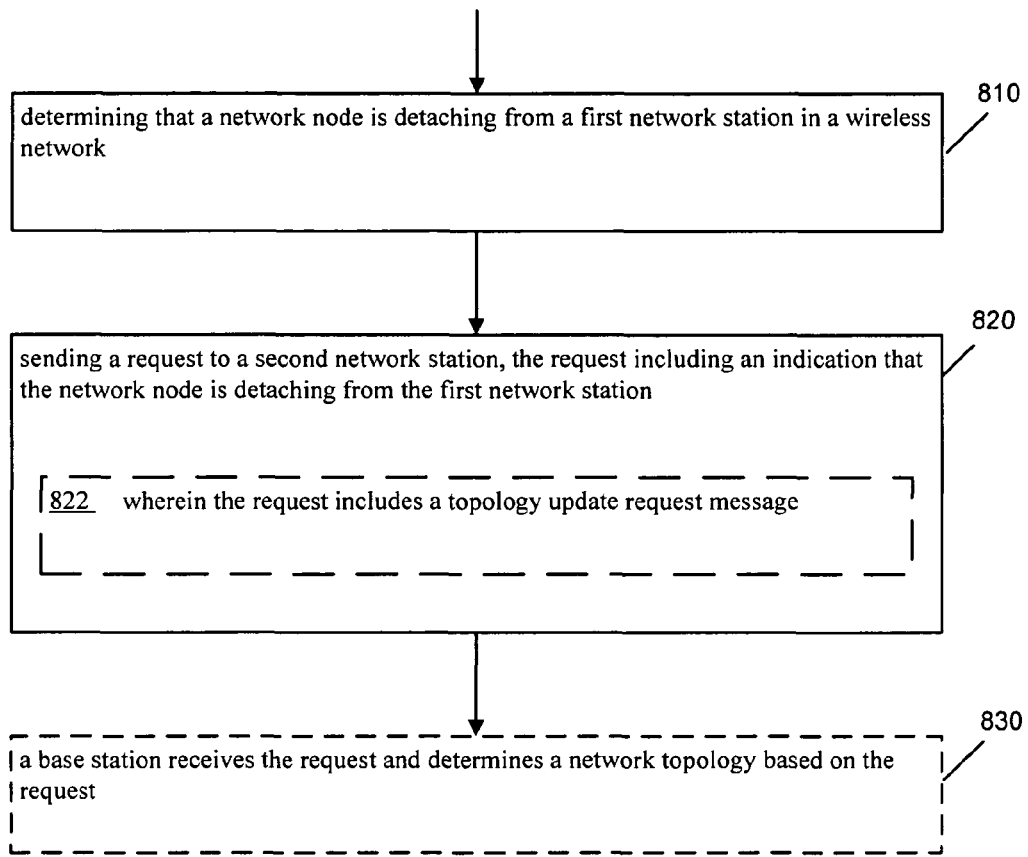
FIG. 8 is a flow chart illustrating operation of a wireless node according to an example embodiment.

FIG. 8 is a flow chart illustrating operation of a wireless node according to an example embodiment. At 810, it may be determined that a network node is detaching from a first network station in a wireless network. At 820, a request may be sent to a second network station, the request including an indication that the network node is detaching from the first network station. According to an example embodiment, the request may include a topology update request message (822).

According to an example embodiment, a base station may receive the request and determine a network topology based on the request (830).

Based on the network topology information obtained from the topology discovery techniques as discussed herein, a MMR-BS, for example, may determine a centralized calculation of a route or communication path between the MMR-BS and any communicating MS/SSs for both an uplink and a downlink direction. Whenever the network topology is updated, for example, due to events such as mobility, the MMR-BS may recalculate the routes or communication paths and may generate new communication paths and/or delete invalid communication paths.

According to an example embodiment, a new RS, acting as a MS/SS, for example, a RS newly attaching to the system, may send an initial RNG-REQ message to all the RSs and/or BS to which it is attaching. For example, $RS_3$ 534 may attach to the system shown in FIG. 5b via a direct coupling with $RS_1$ 530 and a direct coupling with $RS_2$ 532. The RSs to which the new RS attaches may stamp their own signature to the corresponding RNG-REQ message that they receive from the new RS and they may then forward the respective modified RNG-REQ message to the next hop.

When MMR-BS, e.g., MMR-BS 504 of FIG. 5b receives multiple initial RNG-REQ messages from a RS, e.g., $RS_3$ 534, but with different RS signatures, the MMR-BS 504 may determine that the $RS_3$ 534 attaches to the system via more than one RS, and thus that multiple paths exist between the $RS_3$ 534 and the MMR-BS 504.

According to an example embodiment, when a new path is determined after an initial topology discovery or topology update, a MMR-BS may, for example, send the complete path information to all the RSs on one particular path. According to an example embodiment, the MMR-BS may first establish a multicast group and may invite all the RSs on a path to join the multicast group. The MMR-BS may assign a new multicast address for the multicast group. The MMR-BS may then use the multicast address to send all the management messages that are needed by the RSs that are included on the path. For example, the MMR-BS 504 of FIG. 5a may determine a multicast group including $RS_1$ 506, $RS_2$ 508, ... $RS_{n-1}$ 510, $RS_n$ 512 along a communication path between MMR-BS 504 and MS/SS 516.

The MMR-BS may then, for example, send to the multicast group a path advertisement indication or a path advertisement request (Path-Advertisement-REQ) message that may include the complete path information (e.g., indicators associated with the MMR-BS 504, $RS_1$ 506, $RS_2$ 508, ... $RS_n$ 512, MS/SS 516) and a path identifier. Thus, for example, the path advertisement indication or a path advertisement request may be sent as a multicast message addressed to a multicast group address that includes the addresses (e.g., MAC addresses) of all the RSs in the path between the MS/SS and the MMR-BS as multicast group members. When a RS receives the multicast message, for example, every RS in the path (who is a member of the multicast group) may then route the multicast message to the other RSs on the path based on a defined multicast tree, for example. All members of the multicast group may, for example, share a group authentication key.

After receiving the Path-Advertisement-REQ message, the RSs in the multicast group may store the path information, for example, in a local storage device, and may reply, for example, via a path advertisement response (Path-Advertisement-RSP) message, for example, in accordance with an example format as shown below in Table 6.

According to an example embodiment, the MMR-BS may send the path advertisement indication or a path advertisement request message via a unicast message to each RS included in the particular path. Thus, for example, the path advertisement indication or path advertisement request message may be sent as a unicast message sent to each of the one or more relay stations on the path between the MS/SS and the MMR-BS. With this unicast scheme, however, overhead may increase as the number of RSs on a path increases since a separate message is sent to each RS.

According to an example embodiment, the MMR-BS may send the path advertisement indication or a path advertisement request message via a unicast message to the last RS included in the particular path. Thus, for example, the path advertisement indication or path advertisement request message may be sent as a Z-unicast message addressed to the RS directly attached to the MS/SS. In this example, the message may be sent by the MMR-BS to the RS that is most directly attached to the MS, allowing the message to be received and read by each RS along the path. This may provide a more efficient technique by transmitting one message that is used or read by all RSs along the path. When the message reaches each RS on the path, each RS may retrieve parameters from the message, for example, parameters associated with the communication path.

Thus, according to an example embodiment, an MMR-BS may send a Path-Advertisement-REQ message when it intends to advertise the complete path information to all the RSs included in a communication path. An MMR-BS may, for example, generate Path-Advertisement-REQ messages in accordance with the example format as shown in Table 5.

TABLE 5

Example Path-Advertisement-REQ message format

| Syntax | Size |
|---|---|
| Path-Advertisement-REQ( ) { | |
|     Management Message Type | 8 bits |
|     Transaction ID | 16 bits |
|     TLV Encoded Information | Variable |
| } | |

The Path-Advertisement-REQ message may include, for example, TLV fields indicating a path identifier (Path-ID) and/or Path-Information. The Path-Information may, for example, include identifiers associated with each network node included in the communication path to be advertised.

Upon receiving a Path-Advertisement-REQ message from the MMR-BS, a RS may reply via a path advertisement response (Path-Advertisement-RSP) message, for example, in accordance with the example format as shown in Table 6.

TABLE 6

Example Path-Advertisement-RSP message format

| Syntax | Size |
|---|---|
| Path-Advertisement-RSP( ) { | |
|     Management Message Type | 8 bits |
|     Transaction ID | 16 bits |
|     Confirmation Code | 8 bits |
| } | |

An MMR-BS may send a path cancellation request (Path-Cancellation-REQ) message when it intends to cancel a path and to inform the RSs on path of the cancellation decision as well. According to an example embodiment, if a MMR-BS makes a decision to cancel an existing path, it may send to an associated multicast group a path cancellation request (Path-Cancellation-REQ) message which may include, for example, a path identifier (Path-ID) TLV field. An example of a format for a Path-Cancellation-REQ message is shown in Table 7 below.

TABLE 7

Example Path-Cancellation-REQ message format

| Syntax | Size |
| --- | --- |
| Path-Cancellation-REQ( ) { | |
| Management Message Type | 8 bits |
| Transaction ID | 16 bits |
| TLV Encoded Information | Variable |
| } | |

A Path-Cancellation-REQ message may include, for example, one or more path identifier (Path-ID) TLV fields.

The RSs that receive the Path-Cancellation-REQ message may then remove the associated record for the path specified by the Path-ID and may, for example, reply via a path cancellation response (Path-Cancellation-RSP message). Thus, upon receiving a Path-Cancellation-REQ message from the MMR-BS, a RS may remove its stored indication of the identified path, for example, a record for the identified path, and may reply, for example, via a Path-Cancellation-RSP message, for example, in accordance with the example format as shown in Table 8.

TABLE 8

Example Path-Cancellation-RSP message format

| Syntax | Size |
| --- | --- |
| Path-Cancellation-RSP( ) { | |
| Management Message Type | 8 bits |
| Transaction ID | 16 bits |
| Confirmation Code | 8 bits |
| } | |

According to an example embodiment, a MMR-BS may maintain information indicating all the possible paths between a MS/SS and the MMR-BS. Thus, when a new connection is established for an MS/SS, the MMR-BS may select one or more communication paths to carry the traffic for the new connection.

According to an example embodiment, when multiple routes or communication paths exist between a MMR-BS and a MS/SS, the MMR-BS may select a particular path, e.g., based on network parameters or metrics that may include but are not limited to link condition, load condition, overall delay, etc.

According to an example embodiment, to inform all the RSs on the selected paths of the traffic information, the MMR-BS may send a path selection indication or path selection request (Path-Selection-REQ) message to a multicast group to which all the RSs on the selected path belong (e.g., a Path-Selection-REQ message in accordance with an example format as shown below in Table 9). The Path-Selection-REQ message may include, for example, a connection identifier (CID) of the connection, a path identifier (path-id), and optionally a service flow indicator (SFID) and/or a quality of service (QoS) requirement associated with the service flow.

According to an example embodiment, as used in the context of IEEE 802.16 systems, a connection identifier, (CID) may identify a connection to equivalent peers in the medium access control (MAC) layer of a BS and SS. The CID may map to a service flow indicator (SFID), which may define the QoS parameters of the service flow associated with that connection.

According to an example embodiment, when a RS on the path receives the Path-Selection-REQ message, it may record the information, which may be used by the RS to route traffic based on a path that may be specified, for example, in accordance with an example path advertisement technique. If the SFID and the QoS requirement are also present, the RS may also record such information that may be used for scheduling. Each RS that receives the Path-Selection-REQ message may then reply, for example, via a path selection confirmation or path selection response (Path-Selection-RSP) message, e.g., a Path-Selection-RSP message in accordance with an example format as shown below in Table 10, to the MMR-BS.

According to an example embodiment, the MMR-BS may select one or more paths for a particular connection. According to an example embodiment, the MMR-BS may select asymmetric paths for uplink and downlink traffic.

After selecting one or more paths to carry the traffic for a new connection, a MMR-BS may send a Path-Selection-REQ message, for example, in accordance with the example format as shown below in Table 9, to a multicast group to which all the RSs on the selected path belong.

TABLE 9

Example Path-Selection-REQ message format

| Syntax | Size |
| --- | --- |
| Path-Selection-REQ( ) { | |
| Management Message Type | 8 bits |
| Transaction ID | 16 bits |
| TLV Encoded Information | Variable |
| } | |

A Path-Selection-REQ message may, for example, include one or more path identifier (Path-ID) and/or connection identifier (CID) TLV fields. Further, a Path-Selection-REQ message may, for example, include one or more service flow parameter TLV fields.

Upon receiving a Path-Selection-REQ message from the MMR-BS, a RS may retrieve and record the relevant information and may reply, for example, via a path selection response (Path-Selection-RSP) message, for example, in accordance with the example format as shown in Table 10.

TABLE 10

Example Path-Selection-RSP message format

| Syntax | Size |
| --- | --- |
| Path-Selection-RSP( ) { | |
| Management Message Type | 8 bits |
| Transaction ID | 16 bits |
| Confirmation Code | 8 bits |
| } | |

According to an example embodiment, if a single new RS, e.g., $RS_3$ 534 of FIG. 5b attempts to attach to an MMR system via multiple paths (e.g., via one or more paths), the new RS may generate a RNG-REQ message or RNG-REQ messages that includes the RS-ID(s) associated with any network stations to which the new RS wishes to attach. Thus, there is no need for any intermediate node between the new RS and the base station to modify the RNG-REQ message.

For example, if $RS_3$ 534 of FIG. 5b attempts to attach to the system of FIG. 5b, e.g., by directly coupling with $RS_1$ 530 and $RS_2$ 532, the new RS, e.g., $RS_3$ 534 may itself generate a RNG-REQ message or RNG-REQ messages that include the RS-ID(s) associated with any network stations to which the new RS wishes to attach. For example, the $RS_3$ 534 may generate RNG-REQ messages that include the RS-IDs of $RS_1$ 530 and $RS_2$ 532 if $RS_3$ 534 wishes to attach to both $RS_1$ 530 and $RS_2$ 532 and then send the RNG-REQ message(s).

According to an example embodiment, the $RS_3$ 534 may send RNG-REQ messages that do not include the RS-IDs of $RS_1$ 530 and $RS_2$ 532, but may instead, e.g., send a second message, e.g. a topology update message associated with each of $RS_1$ 530 and $RS_2$ 532, to indicate to MMR-BS 504 that $RS_3$ 534 is attaching to both $RS_1$ 530 and $RS_2$ 532.

If multiple communication paths are available between the MMR-BS 504 and a MS/SS and/or any intermediate RSs, the MMR-BS 504 may select an appropriate communication path (or appropriate communication paths) for communicating with any of the MS/SS and/or any intermediate RSs, e.g., based on the selection techniques discussed previously.

As another example, if $RS_n$ 512 of FIG. 5a wishes to attach to $RS_{n-1}$ 512, the $RS_n$ 512 may generate a RNG-REQ message that includes a RS-ID of $RS_{n-1}$ 512 and then send the RNG-REQ message.

According to an example embodiment, the $RS_n$ 512 may send a RNG-REQ message that does not include the RS-ID of $RS_{n-1}$ 512, but may instead, e.g., send a second message, e.g. a topology update message associated with $RS_{n-1}$ 512, to indicate to MMR-BS 504 that $RS_n$ 512 is attaching to $RS_{n-1}$ 512.

Figure 9:
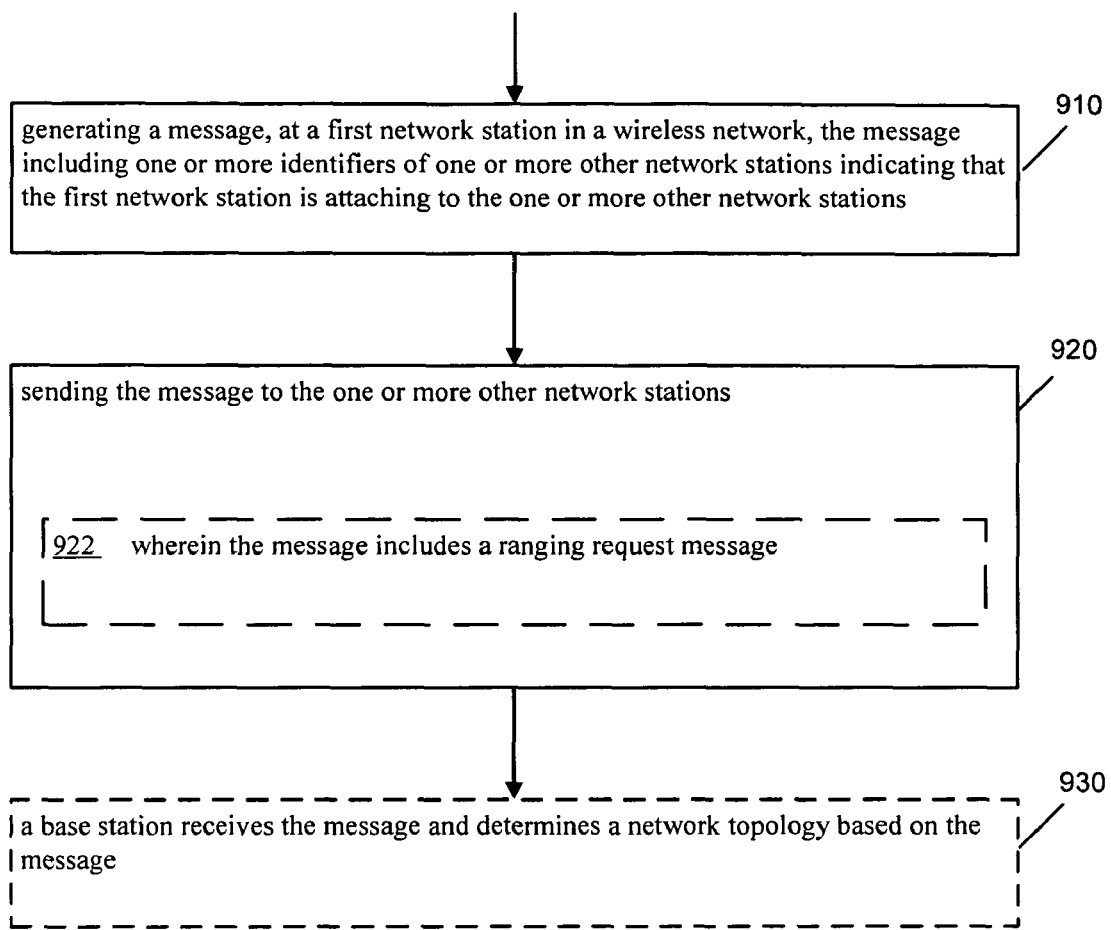
FIG. 9 is a flow chart illustrating operation of a wireless node according to an example embodiment.

FIG. 9 is a flow chart illustrating operation of a wireless node according to an example embodiment. At 910, a message may be generated, at a first network station in a wireless network, the message including one or more identifiers of one or more other network stations indicating that the first network station is attaching to the one or more other network stations. For example, as discussed previously, $RS_n$ 512 of FIG. 5a may wish to attach, e.g., to $RS_{n-1}$ 520, and may thus send, e.g., a ranging request message including a RS-ID associated with $RS_{n-1}$ 520, or $RS_n$ 512 may send, e.g., a topology update request message including a RS-ID associated with $RS_{n-1}$ 520.

For example, as discussed previously, $RS_3$ 534 of FIG. 5b may wish to attach to at least $RS_1$ 530 and $RS_2$ 532, and thus $RS_3$ 534 may, e.g., send a ranging request message including RS-IDs associated with both of $RS_1$ 530 and $RS_2$ 532. Alternatively, $RS_3$ 534 of FIG. 5b may send a ranging request message to each of $RS_1$ 530 and $RS_2$ 532, each ranging request message including an RS-ID associated with a respective one of $RS_1$ 530 and $RS_2$ 532.

For example, as discussed previously, if $RS_3$ 534 of FIG. 5b attempts to attach to the system of FIG. 5b, e.g., by directly coupling with $RS_1$ 530 and $RS_2$ 532, then $RS_3$ 534 may itself generate a RNG-REQ message or RNG-REQ messages that include the RS-ID(s) associated with any network stations to which the new RS wishes to attach. For example, the $RS_3$ 534 may generate RNG-REQ messages that include the RS-IDs of $RS_1$ 530 and $RS_2$ 532 if $RS_3$ 534 wishes to attach to both $RS_1$ 530 and $RS_2$ 532 and then send the RNG-REQ message(s).

According to an example embodiment, the $RS_3$ 534 may instead, e.g., send, e.g. a topology update message associated with each of $RS_1$ 530 and $RS_2$ 532, to indicate to MMR-BS 504 that $RS_3$ 534 is attaching to both $RS_1$ 530 and $RS_2$ 532.

At 920, the message may be sent to the one or more other network stations. According to an example embodiment, the message may include a ranging request message (922).

According to an example embodiment, a base station may receive the message and determine a network topology based on the message (930).

Figure 10:
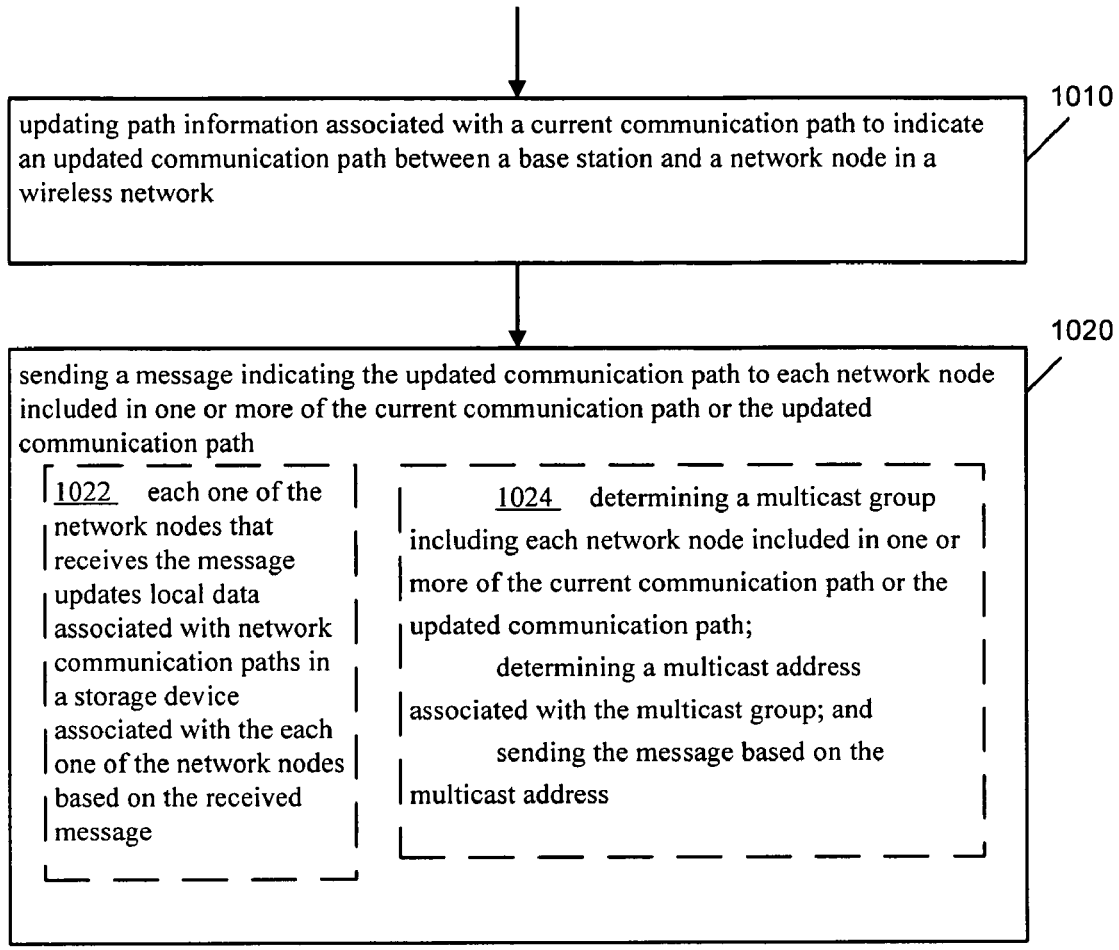
FIG. 10 is a flow chart illustrating operation of a wireless node according to an example embodiment.

FIG. 10 is a flow chart illustrating operation of a wireless node according to an example embodiment. At 1010, path information associated with a current communication path may be updated to indicate an updated communication path between a base station and a network node in a wireless network. At 1020, a message indicating the updated communication path may be sent to each network node included in one or more of the current communication path or the updated communication path.

According to an example embodiment, each one of the network nodes that receives the message may update local data associated with network communication paths in a storage device associated with the each one of the network nodes based on the received message (1022). According to an example embodiment, the sending the message may include determining a multicast group including each network node included in one or more of the current communication path or the updated communication path, determining a multicast address associated with the multicast group, and sending the message based on the multicast address (1024).

Figure 11:
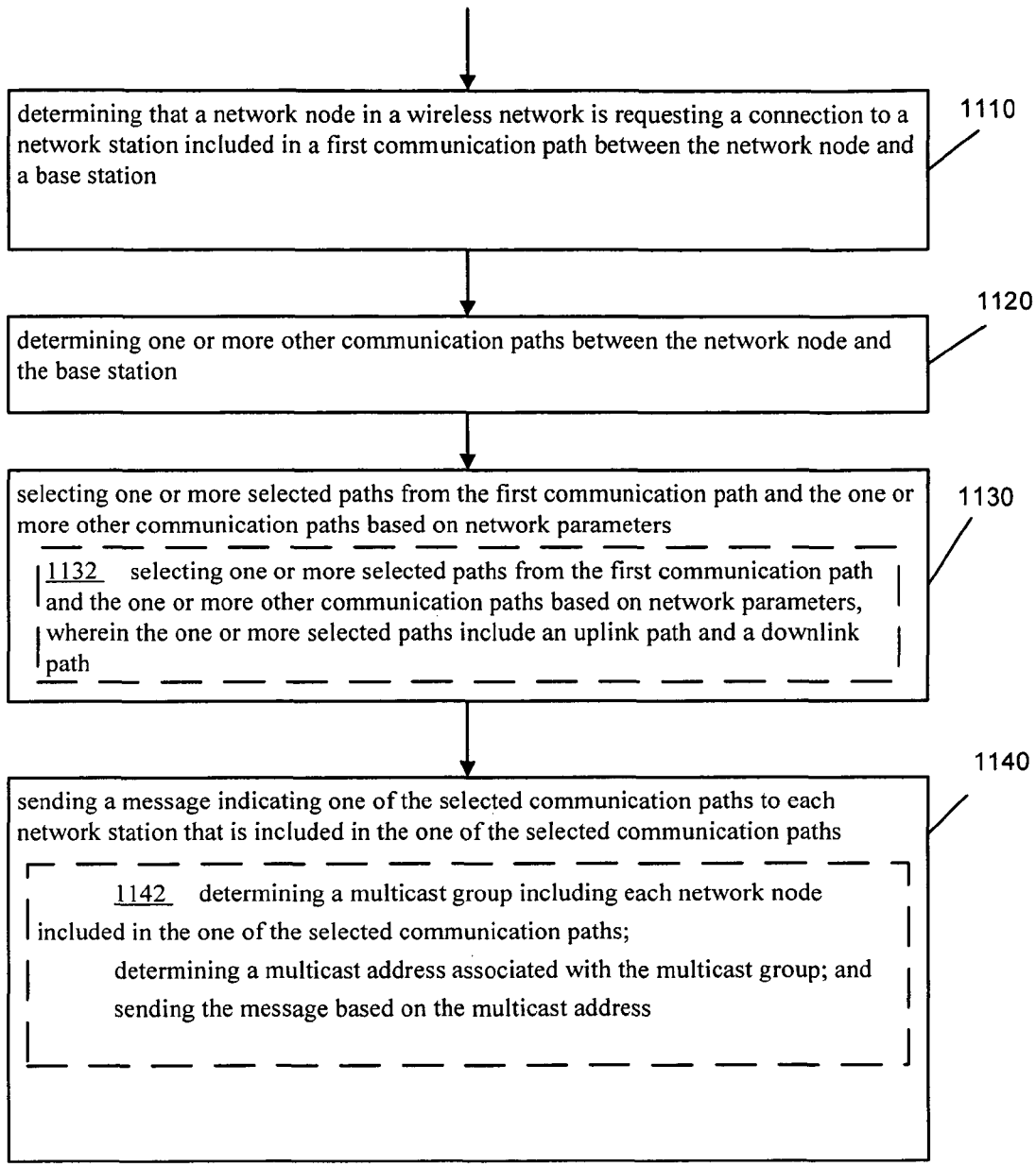
FIG. 11 is a flow chart illustrating operation of a wireless node according to an example embodiment.

FIG. 11 is a flow chart illustrating operation of a wireless node according to an example embodiment. At 1110, it may be determined that a network node in a wireless network is requesting a connection to a network station included in a first communication path between the network node and a base station. For example, it may be determined that $RS_3$ 534 of FIG. 5b may request a connection to $RS_1$ 530, which may be included in a communication path between $RS_3$ 534 and MMR-BS 504.

At 1120, one or more other communication paths between the network node and the base station may be determined. For example, a communication path including MMR-BS 504, $RS_2$ 532, and $RS_3$ 534 may be determined. At 1130, one or more selected paths may be selected from the first communication path and the one or more other communication paths based on network parameters. For example, a path including $RS_1$ 530 may be selected, or a path including $RS_2$ 532 may be selected based on network parameters or metrics. For example, such network parameters or metrics may include but are not limited to link condition, load condition, overall delay, etc.

According to an example embodiment, the selecting may include selecting one or more selected paths from the first communication path and the one or more other communication paths based on network parameters, wherein the one or more selected paths include an uplink path and a downlink path (1132). For example, a path including $RS_1$ 530 may be selected for an uplink flow, and a path including $RS_2$ 532 may be selected for a downlink flow based on network parameters.

At 1140, a message indicating one of the selected communication paths may be sent to each network station that is included in the one of the selected communication paths. According to an example embodiment, the sending of the message may include determining a multicast group including each network node included in the one of the selected communication paths, determining a multicast address associated with the multicast group, and sending the message based on the multicast address.

Figure 12:
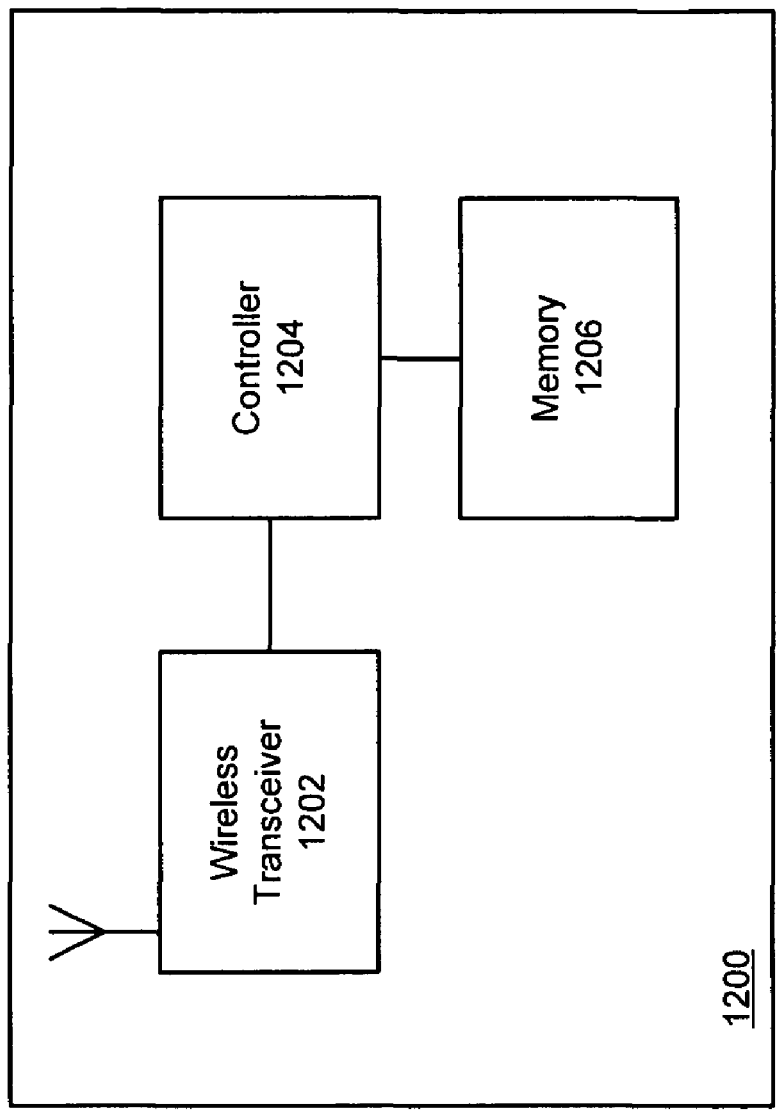
FIG. 12 is a block diagram illustrating an apparatus that may be provided in a wireless node according to an example embodiment.

FIG. 12 is a block diagram illustrating an apparatus 1200 that may be provided in a wireless node according to an example embodiment. The wireless node (e.g. station or AP)

may include, for example, a wireless transceiver 1202 to transmit and receive signals, a controller 1204 to control operation of the station and execute instructions or software, and a memory 1206 to store data and/or instructions.

Controller 1204 may be programmable and capable of executing software or other instructions stored in memory or on other computer media to perform the various tasks and functions described above, such as one or more the tasks or methods described above in FIGS. 1-11.

In addition, a storage medium may be provided that includes stored instructions, when executed by a controller or processor that may result in the controller 1204, or other controller or processor, performing one or more of the functions or tasks described above.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device or in a propagated signal, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

While certain features of the described implementations have been illustrated as described herein, many modifications, substitutions, changes and equivalents will now occur to those skilled in the art. It is, therefore, to be understood that the appended claims are intended to cover all such modifications and changes as fall within the true spirit of the various embodiments.

What is claimed is:

1. A method comprising:
   receiving a first message at a first relay station in a wireless network;
   determining whether the received first message includes a relay station identifier of a second relay station indicating an attachment of a network node to the second relay station;
   modifying the received first message to include a relay station identifier of the first relay station indicating an attachment of the network node to the first relay station based on determining that the received first message does not include the identifier of the second relay station; and
   forwarding the received first message upstream toward a base station.

2. The method of claim 1 wherein the network node comprises a mobile station.

3. The method of claim 1 wherein the first message includes an attachment request.

4. The method of claim 1 wherein the first message includes a ranging request message.

5. The method of claim 1 wherein the first message includes an IEEE 802.16 ranging request (RNG-REQ) message.

6. The method of claim 1 wherein:
   the first message includes a type/length/value (TLV) field;
   the determining includes determining whether the TLV field included in the first message includes the relay station identifier of the second relay station indicating the attachment of the network node to the second relay station;
   the modifying the received first message comprises modifying the TLV field to include the identifier of the first relay station indicating the attachment of the network node to the first relay station based on determining that the TLV field does not include the identifier of the second relay station.

7. The method of claim 1 wherein the base station receives the forwarded first message and determines one or more communication paths between the base station and the network node that includes the network node based on the forwarded first message.

8. The method of claim 1 wherein one or more relay stations receive the forwarded first message and determine one or more communication paths between the base station and the network node that includes the network node based on the forwarded first message.

9. The method of claim 1 wherein the base station receives the forwarded first message and determines a network topology based on the forwarded first message.

10. The method of claim 1 wherein one or more relay stations receive the forwarded first message and determine a network topology based on the forwarded first message.

11. The method of claim 1, wherein the network node receives service from the identified first relay station via the indicated attachment.

12. The method of claim 1, wherein the received first message includes only the identifier of the first relay station or the identifier of the second relay station.

13. A method comprising:
    receiving a first message at a first relay station in a wireless network;
    determining whether the received first message indicates that a network node is attaching to the first relay station;
    forwarding the received first message to a second relay station; and
    sending a second message upstream to the second relay station, the second message including an indication that the network node is directly attached to the first relay station based on the first network station determining that the received first message indicates that the network node is attaching to the first network station.

14. The method of claim 13 wherein the first message includes a ranging request message.

15. The method of claim 13 wherein the second message includes a topology update request message.

16. The method of claim 13 wherein a base station receives the second message and determines a network topology based on the second message.

17. The method of claim 13 wherein one or more relay stations receive the second message and determine a network topology based on the second message.

18. The method of claim 13 wherein a base station receives the second message and determines one or more communication paths between the base station and the network node that includes the network node based on the second message.

19. The method of claim 13 wherein one or more relay stations receive the second message and determine one or more communication paths between a base station and the network node that includes the network node based on the second message.

20. The method of claim 13 and further comprising receiving a third message indicating that a base station received the second message.

21. The method of claim 20 wherein the third message includes a topology update response message.

22. The method of claim 13, wherein the network node receives service from the first relay station via the indicated attachment between the first network node and the first relay station.

23. The method of claim 13, wherein the received first message includes only the indication of attachment to the first relay station.

* * * * *